(12) United States Patent
Malhan et al.

(10) Patent No.: US 11,776,396 B2
(45) Date of Patent: Oct. 3, 2023

(54) INTERSECTION INFRASTRUCTURE WARNING SYSTEM

(71) Applicant: DENSO International America, Inc., Southfield, MI (US)

(72) Inventors: Rajesh Kumar Malhan, Troy, MI (US); Joseph Lull, South Haven, MI (US); Tishya Bhatia, Ypsilanti, MI (US)

(73) Assignee: DENSO International America, Inc., Southfield, MI (US)

( * ) Notice: Subject to any disclaimer, the term of this patent is extended or adjusted under 35 U.S.C. 154(b) by 461 days.

(21) Appl. No.: 16/836,221

(22) Filed: Mar. 31, 2020

(65) Prior Publication Data

US 2021/0183244 A1 Jun. 17, 2021

Related U.S. Application Data

(60) Provisional application No. 62/949,022, filed on Dec. 17, 2019.

(51) Int. Cl.
*G08G 1/09* (2006.01)
*G08G 1/005* (2006.01)
(Continued)

(52) U.S. Cl.
CPC ............ *G08G 1/09* (2013.01); *B64C 39/024* (2013.01); *B64D 47/02* (2013.01); *B64D 47/08* (2013.01);
(Continued)

(58) Field of Classification Search
None
See application file for complete search history.

(56) References Cited

U.S. PATENT DOCUMENTS 10,173,776 B2 1/2019 Goldberg et al.
2016/0019783 A1* 1/2016 Gao ..................... G08G 1/095
340/916

(Continued)

FOREIGN PATENT DOCUMENTS

| CN | 108597220 A | * | 9/2018 | ............ G08G 1/005 |
| WO | 2014080388 A2 | | 5/2014 | |
| WO | WO-2014080388 A2 | * | 5/2014 | ............ B64C 39/024 |

*Primary Examiner* — Heather R Jones
(74) *Attorney, Agent, or Firm* — Harness, Dickey & Pierce, P.L.C.

(57) ABSTRACT

A warning system for warning vulnerable road users (VRUs) includes an edge computing device having a graphics processing unit (GPU), one or more sensors that acquire spatial-temporal data of road users, and one or more warning devices that output a warning to warn targeted VRUs of danger. The GPU uses one or more artificial intelligence (AI) algorithms to process the spatial-temporal data of the road users to predict a path, trajectory, behavior, and intent for the road users. The GPU then analyzes the predictions of the road users to determine convergences between the predictions to determine threat interactions and identify targeted VRUs. In response to determining threat interactions and identifying the targeted VRUs, the edge computing device outputs targeting instructions and warning response instructions to the one or more warning devices to deploy the one or more warning devices to warn the targeted VRUs.

20 Claims, 11 Drawing Sheets

(51) Int. Cl.
  *G06T 1/20*     (2006.01)
  *B64D 47/02*    (2006.01)
  *B64D 47/08*    (2006.01)
  *B64F 1/36*     (2017.01)
  *B64C 39/02*    (2023.01)
  *G06V 20/10*    (2022.01)
  *B64U 10/13*    (2023.01)
  *B64U 101/00*   (2023.01)

(52) U.S. Cl.
  CPC ............... *B64F 1/362* (2013.01); *G06T 1/20* (2013.01); *G06V 20/10* (2022.01); *G08G 1/005* (2013.01); *B64U 10/13* (2023.01); *B64U 2101/00* (2023.01)

(56) References Cited

U.S. PATENT DOCUMENTS

| | | | |
|---|---|---|---|
| 2018/0029706 A1 | 2/2018 | Baruch | |
| 2018/0105107 A1* | 4/2018 | Hassan-Shafique | G08G 1/166 |
| 2019/0287394 A1* | 9/2019 | Aoude | G08G 1/005 |
| 2019/0322367 A1* | 10/2019 | El Idrissi | B64C 39/024 |
| 2020/0317324 A1* | 10/2020 | Youmans | B64C 27/20 |
| 2021/0118303 A1* | 4/2021 | Chan | B60Q 1/525 |
| 2021/0300549 A1* | 9/2021 | Beloussov | B64D 47/02 |

* cited by examiner

INTERSECTION INFRASTRUCTURE WARNING SYSTEM

CROSS-REFERENCE TO RELATED APPLICATIONS

This application claims the benefit of U.S. Provisional Application No. 62/949,022 filed Dec. 17, 2019. The entire disclosure of the application referenced above are incorporated by reference.

FIELD

The present disclosure relates to intersection warning systems. More specifically, the present disclosure relates to intersection infrastructure for providing warnings to vulnerable road users at or near intersections.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional intersection infrastructure can warn both vulnerable road users (VRUs), (e.g. pedestrians) and vehicle drivers of conditions conducive to a collision between a VRU and a vehicle at a traffic intersection. Conventional intersection infrastructure included in intelligent transportation system (ITS) with vehicle-to-infrastructure (V2I) communication systems and vehicles equipped with dedicated short-range communications (DSRC) as part of the V2I system may respectively send and receive warning messages to alert a vehicle driver of potential collisions between a VRU at an intersection. Conventional intersection infrastructure may also be able to send text warnings to the cellular phones of VRUs around the intersection via a short message service (SMS) or dedicated mobile application software (i.e., mobile app) to warn the VRU of potential dangers at an intersection. Conventional intersection infrastructure may also provide graphical warnings and warning messages to an external display visible to both VRUs and vehicle drivers around the intersection. However, while conventional intersection infrastructure can provide some warning to limited VRUs and vehicle drivers around an intersection, the conventional intersection infrastructure for warning VRUs of possible danger from vehicles around the intersection is subject to improvement.

SUMMARY

In one example, an intersection infrastructure warning system for warning vulnerable road users (VRUs) of danger around an intersection may include an edge computing device having a graphics processing unit (GPU), one or more sensors configured to acquire spatial-temporal data of road users in a 360° area around the intersection, and one or more warning devices configured to output a warning to warn targeted VRUs of the danger around the intersection. The GPU may be configured to use one or more artificial intelligence (AI) algorithms to process the spatial-temporal data of the road users to determine at least one of path, trajectory, behavior, and intent predictions for the road users. The GPU may be further configured to analyze the predictions of the road users to determine convergences between the predictions of the road users to determine threat interactions and identify targeted VRUs. In response to determining threat interactions and identifying the targeted VRUs, the edge computing device may be further configured to output targeting instructions and warning response instructions to the one or more warning devices to deploy the one or more warning devices to the targeted VRUs. In response to receiving the targeting instructions and warning response instructions, the one or more warning devices may be further configured to target the targeted VRUs based on the targeting instructions and to output the warning to the targeted VRUs.

In another example, a method for warning VRUs of danger around an intersection may include identifying road users around the intersection and accumulating spatial-temporal data for each of the identified road users. The method may further include processing the spatial-temporal data for each of the identified road users to determine at least one of trajectories, paths, intents, and spatial-temporal behaviors for each of the identified road users and processing the at least one of the trajectories, paths, intents, and spatial-temporal behaviors for each of the identified road users using a first artificial intelligence algorithm to determine at least one of predicted trajectories, predicted paths, predicted intents, and predicted spatial-temporal behaviors. The method may further include analyzing the predictions for each of the identified road users using a second AI algorithm to determine if any conflict zones exist for any of the identified road users, the conflict zones indicating an interaction risk between any of the identified road users.

In even another example, an intersection infrastructure warning system for warning VRUs of danger around an intersection may include an edge computing device having a GPU, one or more sensors configured to acquire data for determining spatial-temporal data of road users in a 360° area around the intersection, and one or more drones configured to output a warning to warn targeted VRUs of the danger around the intersection. The GPU may be configured to use one or more AI algorithms to process the spatial-temporal data of the road users to predict at least one of a path, a trajectory, a behavior, and an intent of a road user. The GPU may be further configured to analyze the predictions of the road users to determine convergences between the predictions of the road users to determine threat interactions and identify the targeted VRUs. In response to determining threat interactions and identifying the targeted VRUs, the edge computing device may be further configured to output targeting instructions and warning response instructions to the one or more drones to deploy the one or more drones to the targeted VRUs. And in response to receiving the targeting instructions and the warning response instructions from the edge computing device, the one or more drones may be further configured to fly to the targeted VRUs based on the targeting instructions and to output the warning to the targeted VRU based on the warning response instructions.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
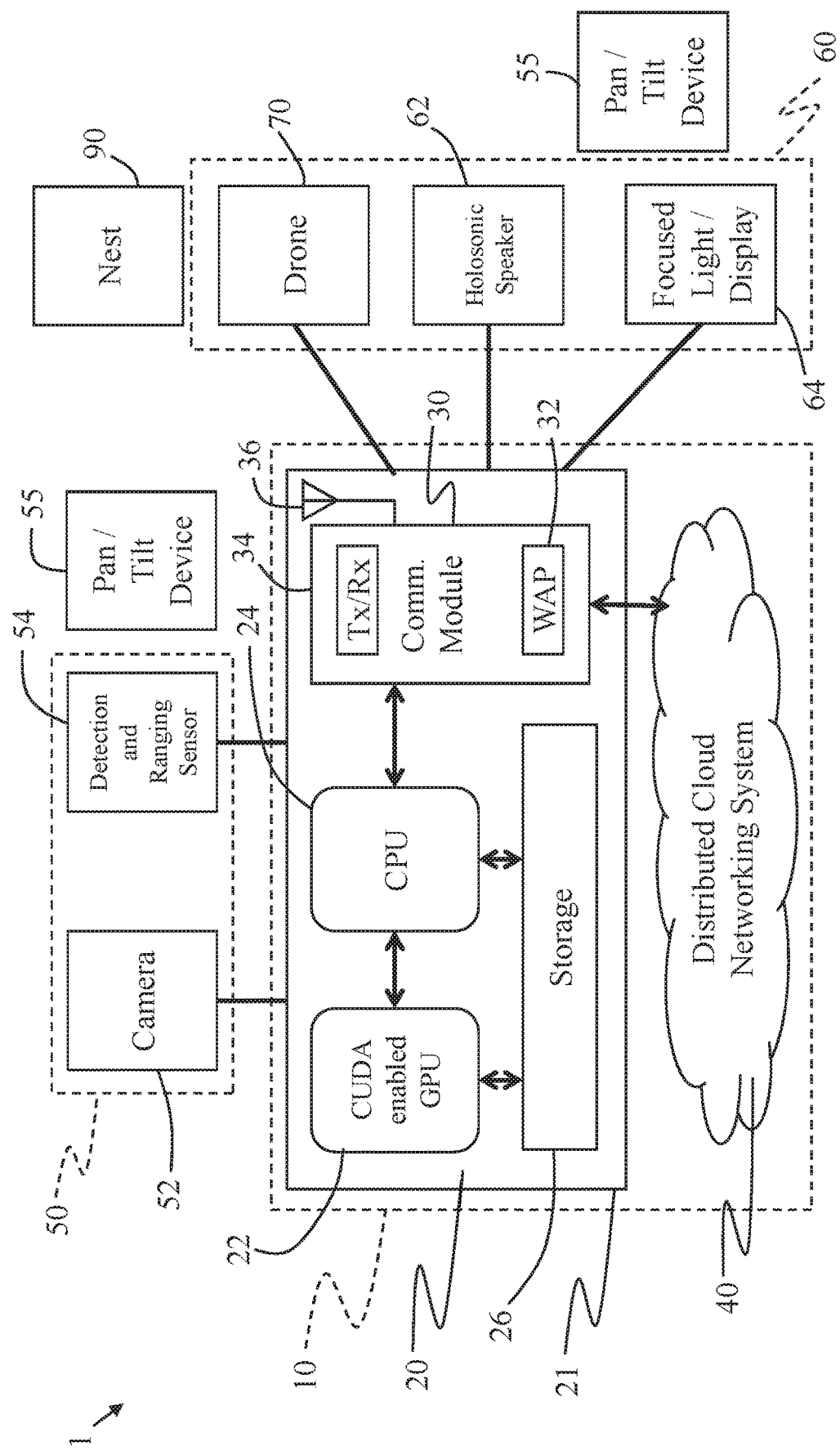
FIG. 1 is a block schematic of an intersection infrastructure warning system.

In conventional intersection infrastructure for providing warnings of conditions conducive to a collision between a vulnerable road user (VRU) and a motor vehicle, the conventional systems may only use data such as basic safety messages (BSM) from vehicles equipped with dedicated short-range communications (DSRC) as part of a vehicle-to-infrastructure (V2I) system for communicating with the infrastructure to determine the possibility of a collision between a VRU and the connected motor vehicle. In other words, these conventional systems rely on only connected vehicles equipped with DSRC to determine potential collisions with VRUs.

Moreover, conventional systems may lack the sensors necessary for providing a complete 360° view of the intersection and the computational capacity to predict the trajectories of motor vehicles and VRUs around the intersection based on the sensor data. That is, conventional systems do not provide a full cognitive sphere or full intersection vicinity analysis of threat conditions to the VRUs, as well as determining precise locations, trajectories, and paths of the VRUs and the vehicles. Such gaps in analysis can result in missed threat warnings to the VRUs that may result in vehicle collisions causing injury. The analysis gaps may also cause false positive warnings that may diminish the VRUs' trust in the warning system and cause VRUs to ignore potential warnings, even if legitimate.

For conventional systems that warn VRUs via the VRUs' mobile phones, such systems assume that VRUs will be carrying mobile phones, that the mobile phones include the necessary hardware/software for receiving warning messages, and that the connected VRUs are timely notified of such collision threats. That is, conventional systems may rely on VRUs being connected to the system via mobile phones and assume that the VRUs can actually be alerted by their mobiles phones in time to perceive the threat and take remedial action. However, in reality, VRUs may miss such alerts resulting in injury. Mobile phones also have limited computing and bandwidth capabilities. As such, even if such phones are networked to infrastructure and/or networked with other users via mobile applications for providing/receiving traffic updates and traffic warnings, such arrangements are limited by the computing and bandwidth capabilities of the mobile phone and have inherent latencies, limited sensor coverage, and recurrent communications between the mobile phones and infrastructure resulting in limited reaction times for the VRUs for accident mitigation and/or prevention.

In conventional systems that provide a more personalized warning to a VRU, such as by use of a drone, the drones of conventional systems may process all the computations necessary for warning a road user on-board the drone itself. That is, the drone itself may use on-board sensors to identify a threat to warn a VRU. However, the on-board computational and sensing capabilities of conventional drone warning systems are limited. That is, conventional drones lack enhanced computational and sensing capabilities. The lack of enhanced processing power and advanced sensors in conventional drones can cause analysis gaps due to the limited processing power and sensing capabilities of such systems. The gaps in analyzing predicted trajectories and real-time paths of all road users around the intersection may cause missed warnings to VRUs and these missed warnings may result in injury to the VRUs. Alternatively, or in addition to the missed warnings, the analysis gaps caused by conventional drones may also cause false-positive warnings, where the drones erroneously alert VRUs to dangerous situations that will never occur. Accordingly, systems with too many erroneous warnings may cause the VRUs to ignore the warnings altogether, even if legitimate. Thus, the drones in conventional systems may not provide complete access and full views of the vicinity surrounding the intersection. Additionally, the drones of conventional systems may not be able to analyze multiple concurrent scenarios to provide broader safety.

Example embodiments are described with reference to the accompanying drawings.

With reference to FIG. 1, a block schematic of an intersection infrastructure warning system 1 for providing warnings to vulnerable road users (VRUs) around an intersection is shown. VRUs may refer to pedestrians and cyclists around an intersection while "road users" may denote all road users including motor vehicles, which may be referred to simply as "vehicles." "At" or "around" the intersection may denote areas around the intersection such as sidewalks, junction roads leading into the intersection, the intersection itself (i.e., the inside area of the intersection where the junction roads can no longer be discerned from one another), and the surrounding vicinity.

The intersection infrastructure 1 includes an edge computing device 10, one or more sensors in a sensor array 50, and a warning device 60.

As compared to conventional computing systems, the edge computing device 10 has enhanced processing capabilities, lower latency, and faster response times. Based on these enhanced capabilities, the edge computing device 10 of the intersection infrastructure 1 can apply artificial intelligence (AI) algorithms to sensor data to determine a 360° analysis of an intersection and the surrounding vicinity to calculate the precise locations and paths of road users around the intersection, and calculate the predicted trajectories and paths of the road users around the intersection. Based on these calculations, the edge computing device 10 can determine multiple concurrent risk scenarios using AI algorithms and models to better identify at-risk VRUs while also identifying the vehicles posing the risk. By using the AI algorithms, the edge computing device 10 of the intersection infrastructure 1 can increase the confidence level of the calculated predictions. The faster computational capabilities of the edge computing device 10 can increase the time horizon for warning a VRU to provide better real-time warnings to VRUs, mitigate danger, and increase safety margins around the intersection. The calculations by the edge computing device 10 can be used as the basis for outputting instructions to a warning device 60 to better warn, intercept, or direct one or more VRUs at the intersection in real-time to mitigate collisions between the VRUs and the vehicles around the intersection.

The edge computing device 10 is configured as a distributed computing system that includes a road side unit (RSU) 20 that networks and communicates with a distributed cloud networking system 40 (i.e., "the cloud"). The RSU 20 includes a graphics processing unit (GPU) 22, a central processing unit (CPU) 24, storage 26, and a communications module 30. The RSU 20 may be housed inside a traffic cabinet 21 at an intersection. The traffic cabinet 21 may include other hardware in addition to the RSU 20 for controlling the traffic signals at an intersection. The RSU 20 of the edge computing device 10, the sensor array 50, and the warning device 60 may be powered directly and/or indirectly from mains electricity used for powering other electric components at the intersection such as the control signals, the pedestrian signals, speakers for audible signals, street lights, electric signage, traffic control signal hardware, and the like. That is, the intersection infrastructure warning system 1 may be powered by the electric infrastructure already in place at the intersection. While the RSU 20 of the edge computing device 10 may be part of a vehicle-to-infrastructure (V2I) system, the RSU 20 of the present disclosure differs from conventional RSUs, in that the RSU 20 includes enhanced computational abilities for executing parallel computations using AI algorithms. The RSU 20 may also be a traditional intelligent transportation system (ITS) V2X device that is configured to coordinate with the edge computing device 10.

The GPU 22 includes various interfaces such as a bus interface and a display interface, a video processing unit (VPU), a graphics memory controller (GMC), a compression unit, and a graphics and computer array (GCA), among other components (all not shown). The GPU 22 supports massive threading and parallel computing and is a CUDA-enabled GPU. CUDA is an abbreviation for Compute Unified Device Architecture and is a registered trademark of the Nvidia Corporation. CUDA is a parallel computing platform and application programming interface that allows the GPU 22 to be used for general purpose parallel processing. While CUDA is used as an example to support parallel computing, the GPU 22 may use an alternative platform and API for parallel processing.

By using the GPU 22, large blocks of data can be used in calculations with AI algorithms more effectively and efficiently than the same calculations using the CPU 24. Such AI algorithms may include, for example, an unsupervised learning algorithm like an Isolated Forest model and a deep learning algorithm like a Sequence-to-sequence model. In other words, using the GPU 22 allows the edge computing device 10 to more quickly execute parallel calculations using AI algorithms to analyze and process measurements from the sensor array 50 and to predict multiple concurrent risk scenarios for vehicles and VRUs around an intersection based on the measurements from the sensor array 50. The GPU 22 may be used with AI algorithms to process and analyze measurement data from the sensor array 50, as well as other data, to determine spatial-temporal data and behaviors for each of the road users, and then predict the paths, trajectories, intent, and behavior for all road users around an intersection, including vehicles. The spatial-temporal data and predictions determined by the GPU 22 for each of the road users may be stored in the storage 26. The spatial-temporal data and predictions by the GPU 22 may be sent to the distributed cloud networking system 40 via the communication module 30 for further processing, such as modeling and simulation.

The CPU 24 may be a processor for executing less computational intensive programs and instruction sets than the GPU 22. The CPU 24 may also be configured as a microcontroller or as a System on Chip (SoC). For example, the CPU 24 may execute programs and instruction sets for transferring data between the storage 26, the GPU 22, and the communication module 30. The CPU 24 may also be used for controlling the communication module 30 to transfer and receive data from the distributed cloud networking system 40.

The CPU 24 may also be used as an input/output for receiving and transmitting data to/from the sensor array 50 and the warning device 60. Alternatively, the communication module 30 may be used for communications between the RSU 20, the sensor array 50, and the warning device 60.

The storage 26 may be a memory such as RAM, ROM, and flash memory, and/or a storage device such as a magnetic hard drive (HDD) or a solid-state drive (SSD) using flash memory. The storage 26 may be used to store spatial-temporal data of the road users and pre-trained models used by the AI algorithms executed by the GPU 22. The storage 26 may also store prediction data from the GPU 22 for further processing by the distributed cloud networking system 40 to generate trained models and run simulations. The storage 26 may also store programs, instruction sets, and software used by the GPU 22 and the CPU 24.

The communication module 30 allows the RSU 20 of the edge computing device 10 to transmit and receive signals and data with external systems, devices, and networks. Generally, the communication module 30 may be used to input and output signals and data to and from the RSU 20. The communication module 30 may be used to receive messages from other connected infrastructure such as signal phase and timing (SPaT) messages from traffic and pedestrian control signals, basic safety messages (BSMs) from vehicles having dedicated short-range communication and connected to a vehicle-to-everything (V2X) system, and personal safety messages (PSMs) from pedestrians and cyclists connected to the V2X system (e.g., by a mobile phone). The communication module 30 may also be used to broadcast SPaT messages and intersection MAP messages to connected road users.

The communication module 30 may include a wireless access point (WAP) 32, gateway, or like networking hardware to wirelessly connect the RSU 20 to an external network such as a wireless local area network (WLAN) or LAN. For example, the wireless access point 32 may be configured to communicate wirelessly using an IEEE 802.11 protocol. Alternatively, or in addition to the WAP 32, the communication module 30 may include a transmitting and receiving device 34 that is configured to communicate either wirelessly or by wire with external devices. The transmitting and receiving device 34 may be, for example, a transceiver, a modem, and a network switch. For example, the transmitting and receiving device 34 may be a cellular transceiver 34 configured to transmit and receive cellular signals at cellular allocated frequencies. As such, the cellular transceiver 34 may be configured for mobile telecommunication and cellular network technologies such as 2G, 3G, 4G LTE, and 5G for transmitting and receiving data to provide mobile broadband capabilities to the RSU 20. A cellular transceiver 34 can connect the RSU 20 to a wireless wide area network (WWAN) or WAN. Generally, the communication module 30 may be configured for wired and wireless communications using common communication standards and technology such as IEEE 802.3, IEEE 802.11, Bluetooth, mobile broadband, and the like.

The communication module 30 may be connected by wired connection or wirelessly with the sensors of the sensor array 50 and the one or more warning devices 60. The communication module 30 may also include one or more antennas 36 for transmitting radio signals from the communication module 30 and receiving radio signals at the communication module 30. Alternatively, both the WAP 32 and the transmitting and receiving device 34 may respectively include one or more individual antennas.

The distributed cloud networking system 40 (i.e., "the cloud") is one or more cloud computing elements that is part of the edge computing device 10. The distributed cloud networking system 40 provides additional resources like data storage and processing power to the edge computing device 10. Because the distributed cloud networking system 40 is accessible over the Internet, the cloud 40 is configured to communicate with the RSU 20 of the edge computing device 10 via the communication module 30.

The cloud 40 may include any number or different services such as infrastructure as a service (IaaS), platform as a service (PaaS), software as a service (SaaS), backend as a service (BaaS), serverless computing, and function as a service (FaaS). The cloud 40 may be a commercial cloud computing service such as Amazon Web Services (AWS), Microsoft Azure, Google Cloud Platform (GCP), or Oracle Cloud, all registered trademarks.

In addition to the AI algorithms used by the GPU 22 to calculate the predicted trajectories and paths of road users around an intersection, the cloud 40 may be used to calculate trained models and run simulations that can be used by the GPU 22 and applied to the AI algorithms to better calculate the predicted paths, trajectories, and behaviors of the road users around an intersection, and to better identify the vehicles posing threats to the VRUs. Trained models calculated by the cloud 40 may be stored in the storage 26 of the RSU 20 for use by the GPU 22.

While the description may describe specific components of the edge computing device 10 performing a function or process, the edge computing device 10 generally performs the same function or process described as being performed by the subsystem or sub-component of the edge computing device 10. That is, higher level components can also be described as performing the same functions as their subsystems and sub-components. For example, while the GPU 22 is described as performing calculations using AI algorithms, both the edge computing device 10 and the RSU 20 can also be described as performing calculations using AI algorithms.

The sensor array 50 includes sensors that are used to acquire spatial-temporal data from all road users around the intersection, including vehicles. The sensor data from the sensor array 50 can be used by the GPU 22 to calculate the predicted paths and trajectories of all road users around an intersection. That is, the sensor array 50 acquires spatial-temporal data for detecting, localizing, and tracking all road users around the intersection. The intersection infrastructure may include one or more sensor arrays 50 at different locations around an intersection to obtain a 360° view and sensing area of the intersection. The one or more sensor arrays 50 at an intersection may provide a viewing and sensing area, for example, with a two hundred meter radius centered at the intersection. That is, the sensors 52 and 54 in the sensor array 50 have a range of about two hundred meters from the intersection.

Each sensor array 50 may include one or more cameras 52 and one more detection and ranging sensors 54. While the camera 52 and the detection and ranging sensor 54 are described as being part of a sensor array 50, the camera 52 and the detecting and ranging sensor 54 are not necessarily limited to this configuration and may be disposed separately and in different locations around the intersection. Alternatively, instead of the sensor array 50 having a combination of cameras 52 and detection and ranging sensors 54, the sensor array 50 may be limited to either (i) an array of one or more cameras 52 oriented at different angles and different directions, or (ii) an array of one or more detection and ranging sensors 54 oriented at different angles and different directions. In this alternative configuration, camera array 50 and ranging sensor array 50 are used to distinguish between sensors arrays having only one type of sensor.

The camera 52 may be a normal optical device relying on natural light to capture images. The camera 52 may be configured to capture individual images or a video stream. For example, the camera 52 may be configured to capture sequential images or real-time video of road users at a predefined interval or frame rate with the captured images/video being used by the GPU 22 to determine spatial-temporal data for each road user.

Images and videos captured by the camera 52 may be further processed by the GPU 22 with machine vision algorithms to identify and track all the road users within the viewing range of the camera 52 (e.g., 200 meters).

The camera 52 may include additional enhancements to reduce the camera's reliance on natural light. For example, the camera 52 may include artificial lights and flashes to provide better image capturing capabilities. The camera may also include advanced sensors such as a complementary metal-oxide-semiconductor field-effect transistor (CMOS) sensor for better capturing images in poor or low lighting conditions. Such sensors may be combined with artificial light such as infrared lighting for low light imaging and night vision capabilities. Alternatively, the camera 52 may be a thermographic camera such as an infrared camera or a thermal imaging camera for capturing images of the road users by using the heat signatures of the road users.

While the RSU 20 may use machine vision algorithms on the image data captured by the camera 52 to identify and track road users around the intersection, sequential still images and video streams of road users captured by the camera 52 may be processed by the GPU 22 to generate spatial-temporal data for all road users around an intersection. Spatial-temporal data acquired by the camera 52 may include the trajectory, path, direction, bearing, and azimuth for all the tracked road users. For example, image data captured by the camera 52 may be used to identify the trajectories of the road users and the changes in the trajectories of the road users. The GPU 22 may also use image and video data from the camera 52 to calculate speed and acceleration of the tracked road users, but this data may be better acquired by the detection and ranging sensor 54. The spatial-temporal data can be further processed by the GPU 22 with AI algorithms to predict the trajectories, paths, and spatial-temporal behaviors of the road users around the intersection.

In addition to tracking the movement of road users to generate spatial-temporal data of the road users, the camera 52 may be used to capture other data around the intersection. For example, the camera 52 may be used to monitor the road condition and detect objects in the road such as pedestrians, cyclists, animals, potholes, roadkill, lost loads, refuse, and the like, all of which may cause road users to swerve or brake to avoid the object. That is, the camera 52 may correlate the detected object to the trajectories, speeds, and accelerations of the road users to develop spatial-temporal behavior patterns for the road users. For example, if road users in the road are swerving to avoid a pothole, the GPU 22 may correlate the pothole to changes in the road users' trajectories when determining the predicted trajectories of the road users. Such data can be used by the GPU 22 and applied to the AI algorithms to better predict the trajectories and paths of the road users in view of such objects.

Likewise, the camera 52 may be used to monitor weather conditions to determine if the weather may affect the behavior of the road users. For example, rain and snow may affect the road surface causing a more slippery road surface and requiring extra time for road users to slow to a stop or necessitating extra care in driving/riding/walking on such surface. Such information can be used by the GPU to detect changes in the road users' trajectories, speeds, and accelerations to identify spatial-temporal behaviors. The GPU 22 may correlate such weather conditions to the trajectory, speed, and acceleration data acquired by the sensor array 50 and factor these spatial-temporal behaviors into the trajectory and path predictions by the GPU 22. That is, the weather data acquired by the camera 52 can be used by the GPU 22 and applied to the AI algorithms to better predict the trajectories and paths of the road users in view of such weather conditions.

The sensor array 50 may also include one or more detection and ranging sensors 54. The detection and ranging sensor 54 may be configured to output a radio wave, receive the reflected radio wave, and measure a time from outputting the radio wave to receiving the reflected radio wave. The time measurement from the sensor 54 can be used as a basis for detecting a road user and calculating the speed and acceleration of the road user. For example, the ranging sensor 54 may output a radio wave toward a road user and receive the radio wave reflected from the road user to detect and measure the speed and acceleration of the road user. As such, the detection and ranging sensor 54 may be a radar sensor 54. The detection and ranging sensor 54 may also be configured to output a light, such as infrared laser light, receive the reflected light, and measure a time from outputting the light to receiving the reflected light. By measuring a time to receive the reflected light, the detection and ranging sensor 54 can use the time measurement as the basis for detecting a road user and measuring the speed and acceleration of the road user. As such, the detection and ranging sensor 54 may be a lidar sensor. The sensor array 50 may include one or more lidar and radar sensors 54 or a combination of lidar and radar sensors 54. The speeds and accelerations detected by the detection and ranging sensor 54 may be used by the GPU 22 to calculate spatial-temporal data and spatial-temporal behaviors for all the road users around the intersection. The spatial-temporal data/behaviors for all the road users can then be further processed by the GPU 22 using AI algorithms to predict the trajectories, paths, and spatial-temporal behaviors of the road users around the intersection.

The sensor array 50, or individual cameras 52 and detection and ranging sensors 54, may be statically mounted at intersections to acquire a 360° view around the intersection. For example, at a four-way intersection, a sensor array 50 or individual sensors 52 and 54 may be installed to acquire data for each of the four junction roads approaching the intersection (i.e., each junction road having a dedicated sensor array 50). In this example, each sensor array 50 or sensor 52, 54 may be configured to have a 90° or greater field of view for each of the junction roads approaching the intersection. Additional sensors arrays 50 or individual sensors 52 and 54 may be installed to provide a 360° view within the intersection itself.

Figure 2:
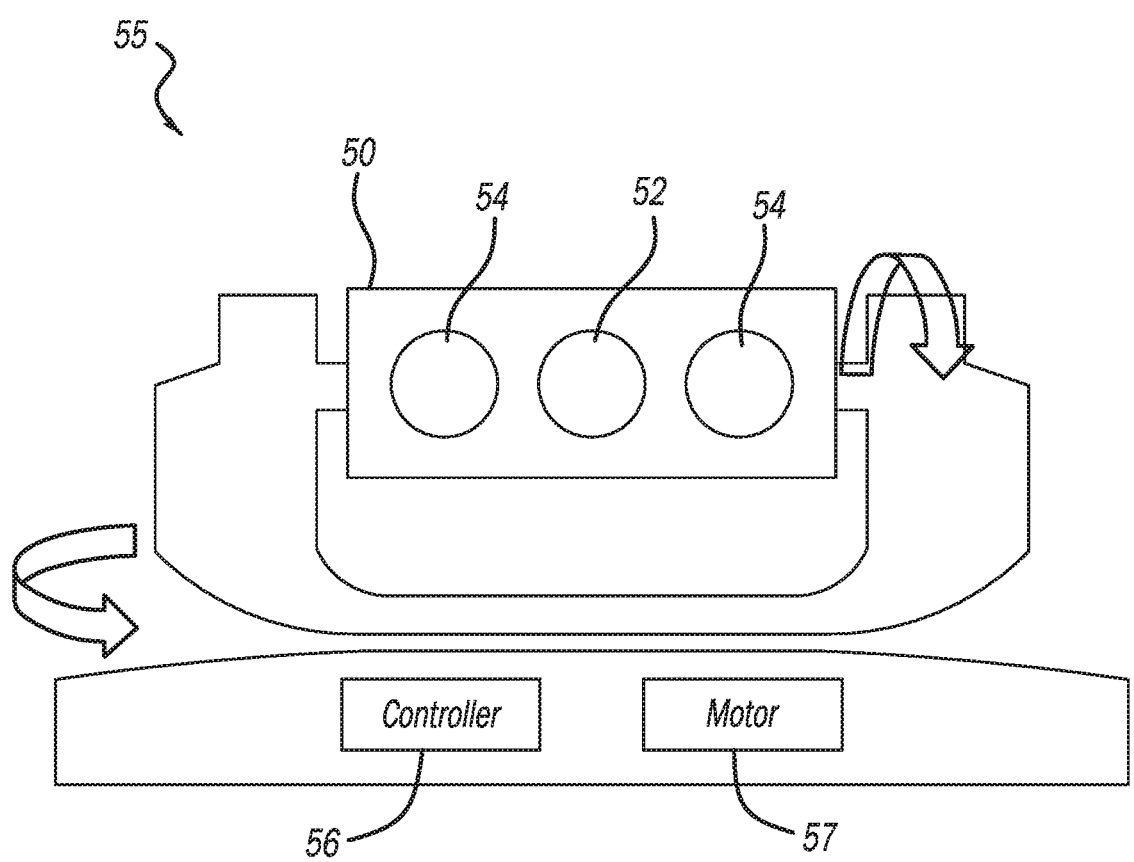
FIG. 2 is a perspective view of a pan tilt device.

Alternatively, with reference to FIG. 2, the sensor array may use a pan and tilt (PT) device 55 to rotate and tilt the sensor array 50 toward a road user to capture data from the road user. The PT device 55 may be wired to the RSU 20 or communicate wirelessly with the RSU 20. The PT device 55 may include a controller 56 and one or more motors/actuators 57 to control the rotation and tilt of the PT device 55. While FIG. 2 shows a PT device 55 with the sensor array 50, individual sensors 52, 54 may be used with the PT device 55 to rotate and tilt the sensors toward road users to capture data. That is, the PT device 55 may be used to aim the sensor array 50 at road users to capture spatial-temporal data from the targeted road users. More specifically, the apertures or lenses that serve as the inputs/outputs of the sensors 52 and 54 may be aimed at road users by the rotation and tilt capabilities of the PT device 55 to better capture the spatial-temporal data from road users. Motion detection sensors around the intersection (not shown) may also be used with the PT device 55 to better target road users.

Actuators that may be employed by the PT device 55 include one or more electronic, electro-magnetic, motorized, linear screw, or piezo-deformable actuators. For example, a linear screw actuator may provide fast, coarse targeting of the sensor array 50, while a piezo-deformable actuator can simultaneously provide a finer and more precise targeting. Motorized actuators may include servomotors and stepper motors.

The controller 56 of the PT device 55 may be used to calibrate the PT device 55 and return the PT device 55 to a "home" or reference position. Calibrating the PT device 55 may be performed algorithmically using intrinsic and extrinsic parameters. The controller 56 is also configured to receive targeting coordinates from the RSU 20, and in response, control the motors/actuators to rotate and tilt the sensor array 50 based on the coordinates from the edge computing device 10.

The PT device 55 may also be used with one or more of the warning devices 60 to control the targeting and targeted output of the warning devices 60. For example, the PT device 55 may be used with a holosonic device 62 or a focused light display 64 to rotate and tilt the device 62 or the light display 64 to target the output of the device 62 or the light display 64. In other words, based on the risk assessments calculated by the edge computing device 10, the edge computing device 10 can output the current and predicted paths of VRUs identified by the risk analysis as at-risk as control instructions to the PT devices 55 used to rotate and tilt the device 62 and the light display 64. The controllers 56 can use the current and predicted paths of the at-risk VRUs to aim the outputs of the holosonic device 62 or light display 64 at the at-risk VRUs to provide a targeted warning at the precise, real-time locations of the at-risk VRUs.

The PT device 55 may be integrated with any of the sensor array 50, the camera 52, the detection and ranging sensor 54, the holosonic device 62, and the focused light display 64 so that any of these components and the PT device 55 appear as one assembly. By using such an example integrated assembly, "targeting the holosonic device 62" may mean outputting targeting instructions to the controller 56 of the pan/tilt portion of the holosonic device 62 to rotate and tilt the device 62 to aim the output of the device 62 at a VRU.

Figure 4:
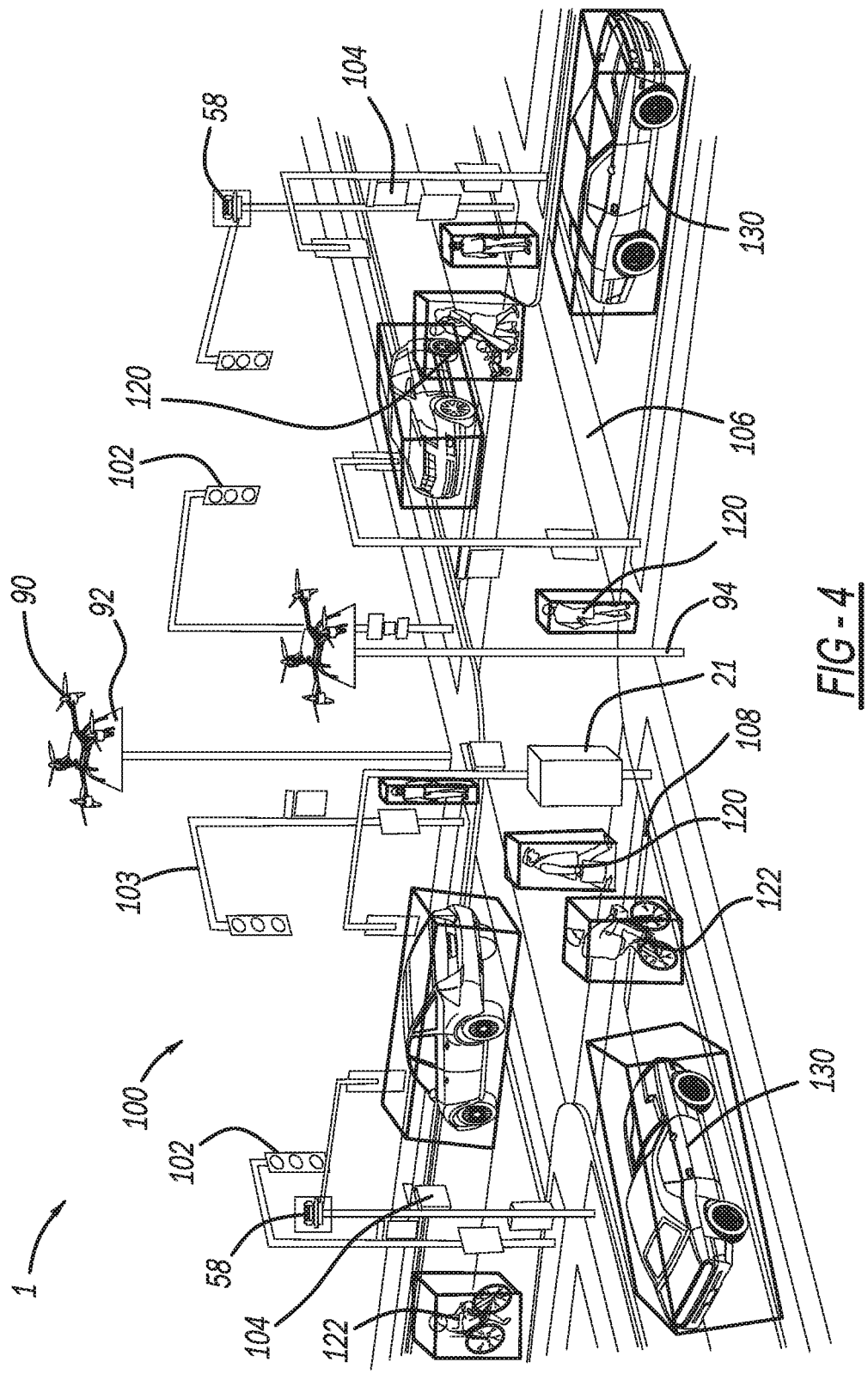
FIG. 4 illustrates a perspective view of an intersection using an intersection infrastructure warning system.

With reference to FIG. 4, the sensor array 50 or individual sensors 52 and 54 may be housed within a housing 58. The housing 58 may protect the sensor array 50 or individual sensors 52 and 54 from exposure to the elements. The housing 58 is sized appropriately to fit the sensor array 50 or individual sensors 52 and 54, including the PT device 55.

With reference again to FIG. 1, the intersection infrastructure may use one or more warning devices 60 to warn VRUs of risk and danger scenarios and mitigate collisions between the VRU and a vehicle. The warning devices 60 may be one or more holosonic devices 62, one or more focused light displays 64, and one or more drones 70, or any numbered combination of holosonic devices 62, light displays 64, and drones 70.

The warning devices 60 are configured to receive targeting and output instructions from the RSU 20. The targeting and output instructions from the RSU 20 are based on the predicted trajectories and paths of the road users made by the GPU 22 by applying AI algorithms to the spatial-temporal data of the road users acquired by the sensor arrays 50 and calculated by the GPU 22. The GPU 22 then further processes the spatial-temporal data of the road users and analyzes the data for risks to VRUs around the intersection to identify at-risks VRUs. At-risk VRUs identified by the RSU 20 are tracked and targeted using both the sensor data from the sensor array 50 and the predicted trajectories of the at-risk VRUs computed by the GPU 22 using the corresponding spatial-temporal data. More specifically, the GPU 22 of the RSU 20 may use detection algorithms to precisely identify and localize the at-risk VRUs (i.e., targeted VRUs). The RSU 20 can then control the warning device 60 to output a targeted warning to the targeted VRU to warn the targeted VRU of risk and danger. The warning device 60 may continue to output a targeted warning to the targeted VRU until the targeted VRU moves away from the danger/risk scenario, or the danger/risk scenario no longer poses a risk to the targeted VRU (i.e., the danger has passed).

The holosonic device 62 may be a holosonic speaker 62 and use modulated ultrasound to output a tight, narrow beam of targeted sound to a VRU. The holosonic device 62 may output an audible warning to a targeted VRU such as "stop," "stay back," "move back," "do not walk," "oncoming traffic," "danger," alarm sound, siren, horn, or with another warning message or sound conveying danger to the targeted VRU. The holosonic speaker 62 may also output sound at different volumes and intensity levels commensurate to the danger. For example, the holosonic speaker 62 may output a very loud targeted sound at a high volume to warn a VRU of very dangerous situations. The targeted sound output from the holosonic speaker 62 to a VRU may only be audible or discernible by the targeted VRU. In this way, other road users not in danger may not hear the targeted audio warning. As such, the other, not-at-risk road users may not be caused to erroneously react to a warning message that is not intended for the road users. Such targeted warning messages may limit and/or prevent the not-at-risk road users from losing trust in the warnings output by the intersection infrastructure 1.

The focused light display 64 may use focused light or imaging to output a targeted warning light or image to an at-risk VRU (i.e., a targeted VRU). The targeted warning light or warning image may be only visible to the targeted VRU. The focused light display 64 may use lights such as lasers and light emitting diodes (LEDs) to output the warning light or image. The focused light display 64 may also use a display screen such as an LED display, a quantum dot display (e.g., QLED), or like display to output a targeted high intensity image, animation, or video to a targeted VRU. The targeted warning light may use a blinking or strobe effect to get the attention of the targeted VRU to warn of danger. For example, the focused light display 64 may flash a focused, narrow-beam high intensity light in the face of a targeted VRU to get the attention of the targeted VRU and warn the targeted VRU of danger. The focused light display 64 may also output light in a known warning color such as red, or output different light colors in a known display pattern such as the red-yellow-green pattern of a traffic signal to instruct the targeted VRU to start or stop moving. Similarly, videos and animations output by the light display 64 may use known warning colors or visual effects to better draw the targeted VRU's attention to the display.

The focused light display 64 may also output an instruction or symbol to denote or indicate danger such as "stop," "stay back," "move back," "do not walk," "oncoming traffic," "danger," the "Don't Walk" symbol or text used by pedestrian control signals, a car symbol, an exclamation point inside a triangle, or like text and symbols denoting danger.

The light display 64 can also output specific instructions or a series of instructions to the targeted VRU in text or symbolic form to instruct the VRU on how to avoid the dangerous situation. For example, if the edge computing device 10 predicts a vehicle skidding off an icy road and onto a sidewalk with VRUs, the light display 64 may display arrows indicating the directions the VRUs should move to avoid the skidding car. Likewise, the light display 64 may flash a directional arrow with a distance measurement indicating a VRU should move in the direction of the arrow by the given measurement to avoid danger.

The focused light display 64 can also be a holographic projector that outputs a targeted holographic image of any of the aforementioned text, symbols, animations, or videos in holographic form to warn the targeted VRU of danger.

The intersection infrastructure may use the holosonic device 62 and focused light display 64 either individually, or in combination, to output both targeted audible and visible warnings to a targeted VRU. Similar to the sensor array 50, the holosonic speaker 62 and the focused light display 64 may be integrated into a single assembly such that the assembly can output both targeted audio and visual warnings. Alternatively, a plurality of holosonic speakers 62 can be arranged as its own array without any focused light displays 64. Likewise, a plurality of focused light displays 64 can be arranged as its own array without any speakers 62.

The holosonic device 62 and the focused light display 64 may each use a PT device 55 shown in FIG. 2 to better output targeted warnings to targeted VRUs. Accordingly, warning devices 60 using PT devices 55 may receive targeting instructions from the RSU 20 to rotate and tilt the warning devices 60 to precisely target the output of the warning device 60 to the targeted VRU.

Figure 3:
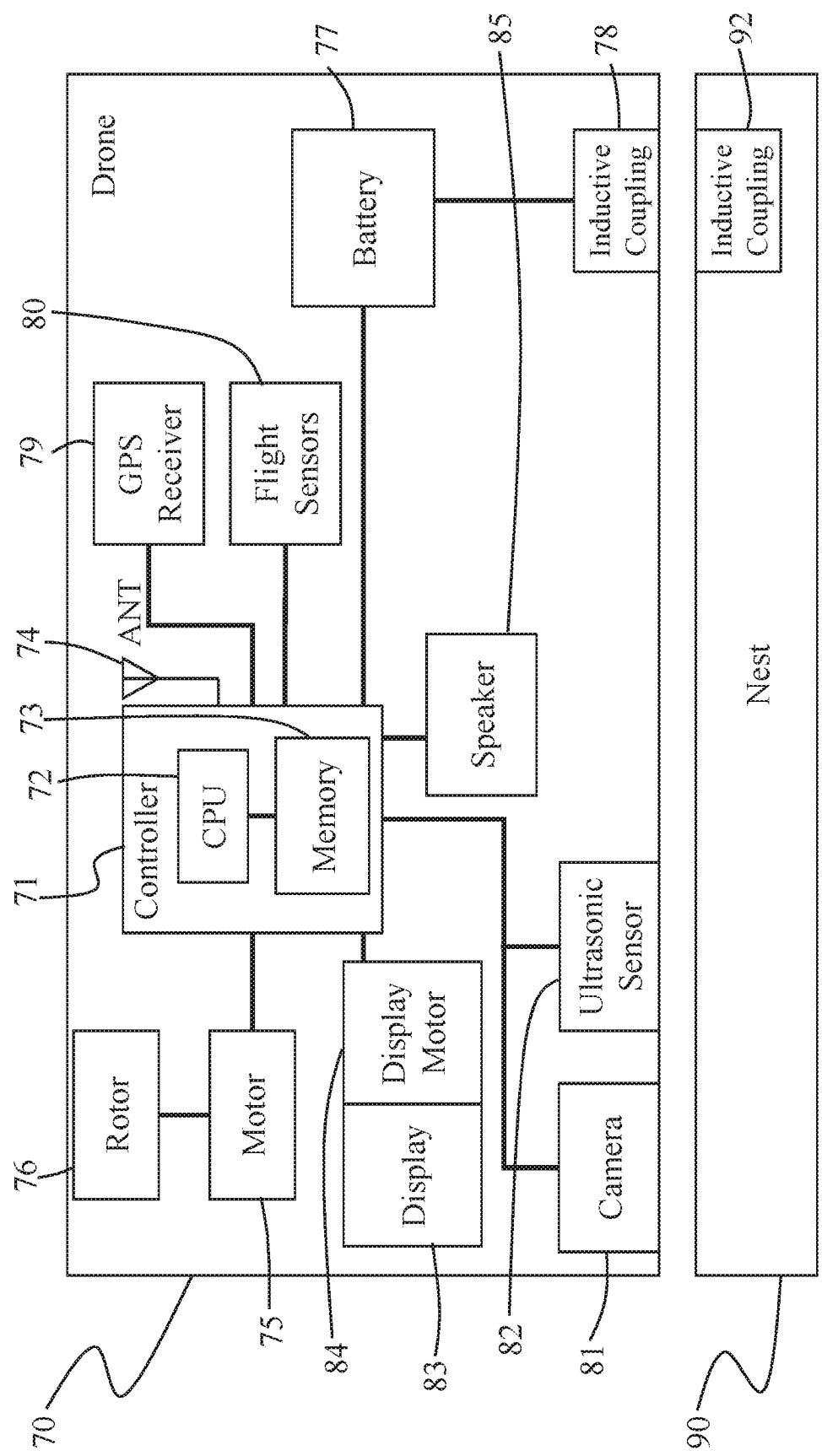
FIG. 3 is a block schematic of a drone and a nest.

The intersection infrastructure warning system 1 may also use one or more drones 70 to warn VRUs of potential danger. With reference to FIG. 3, a schematic diagram of a drone 70 is shown with a nest 90.

The drone 70 may be an off-the-shelf commercial drone that is modified for use in the intersection infrastructure warning system 1. For example, the drone 70 may be an off-the-shelf quadcopter with four rotors. The drone 70 includes a controller 71, one or more motors 75, one or more rotors/propellers 76, a battery 77, an inductive coupling 78, a GPS receiver 79, flight sensors 80, a camera 81, an ultrasonic sensor 82, a display 83, and a speaker 85.

The controller 71 may be a microcontroller or system on chip (SoC) configured for wireless communication. For example, the controller 71 may be configured to transmit and receive encrypted wireless radio signals using a wireless communication standard such as IEEE 802.11. The transmitting and receiving hardware of the controller 71 is not shown. The controller includes one or more processors 72 and memory 73. The memory 73 may be a memory such as RAM, ROM, and flash memory, and the memory can be used to store programs and instruction sets that are executable by the processor 72 for controlling the flight of the drone. The controller 71 also includes an antenna 74 for transmitting and receiving radio signals. For example, the controller 71 may receive instructions sets from the communication module 30 of the RSU 20 via the antenna 74. Instruction sets from the edge computing device 10 can be stored in memory 73 and executed by the processor 72. The controller 71 may also control the power output to other electronic elements in the drone 70, receive and process sensor data from sensing elements in the drone 70, and output control signals to elements in the drone 70.

The controller 71 can control one or more motors 75 to control the flight of the drone 70. Each motor has a corresponding rotor/propeller 76. For example, a quadcopter drone 70 may have four motors 75 and four rotors 76. In lieu of a motor 75 and rotor/propeller 76 combination, the drone 70 may use another propulsion system for flying the drone.

By controlling each of the motors 75 to control the rotation of the rotors 76, the controller 71 can fly the drone 70 in any direction depending on the control signals output to the motors 75. The communication module 30 of the RSU 20 may output flight instructions (i.e., targeting instructions) directing the drone 70 to fly to a targeted VRU to warn the targeted VRU of risk or danger. Based on the targeting instructions from the RSU 20, the controller 71 then controls the motors 75 to fly the drone to the targeted VRU. The instructions from the RSU 20 may also include return instructions for directing the drone 90 to return to the nest 90. In some instances, the return instructions may be following a reverse flight path from the flight path used to reach the targeted VRU.

The drone 70 may include one or more batteries 77 as a power source. The battery 77 may be rechargeable. For example, the battery 77 may be chargeable by an inductive coupling 78 for inductive charging of the battery 77. The drone 70 may nest on a nest 90 positioned around an intersection that supports the drone 70 when the drone 70 is not in flight. That is, the nest 90 may act as a landing location and storage position (i.e., "rest position") for the drone 70 when the drone 70 is not in use as a warning device 60. The nest 90 may also include an inductive coupling 92 that aligns with the inductive coupling 78 on the drone 70 to charge the one or more batteries 77 of the drone 70 when the drone 70 is not in use. The inductive coupling 92 is configured to receive power from the electric infrastructure already present at the intersection for powering the other electric devices around the intersection.

The drone 70 may also include components such as the GPS receiver 79 and the flight sensors 80 to properly direct and position the drone in flight. The GPS receiver 79 may be used by the controller 71 in conjunction with flight/targeting instructions from the RSU 20 to control the motors 75 to ensure the drone 70 flies according to the instructions from the RSU 20. The flight sensors 80 may include various sensors such as multi-axis accelerometers and gyroscopes to ensure that the drone 70 stays level in flight with the correct position and orientation (e.g., right-side-up, oriented toward a targeted VRU). Accordingly, the controller 71 may use such data from the flight sensors 80 to control the motors to fly the drone with the correct position and orientation.

The drone 70 may also include a camera 81 and/or an ultrasonic sensor 82. The camera 81 and the ultrasonic sensor 82 may be disposed on the underside (i.e., bottom) of the drone 70 and used to help land the drone. For example, image data from the camera 81 may be used by the controller 71 to control the motors 75 to land the drone 70 with the correct position and orientation on the nest 90 (i.e., to properly align the inductive coupling 78 on the drone 70 with the inductive coupling 92 on the nest 90). Alternatively, or in addition to the camera 81, an ultrasonic sensor 82 may be used to help land the drone 70 on the nest 90. The ultrasonic sensor 82 may output ultrasonic waves and sense reflected waves to determine the distance from an object (e.g., the nest 90). Sensor data from the ultrasonic sensor 82 can be used by the controller 71 to control the motors 75 to properly land the drone 70 on the nest 90. The ultrasonic sensor 82 may also be used when the drone 70 is hovering to maintain the drone at a fixed height relative to the ground during hovering. In place of the ultrasonic sensor 82, a precision altimeter or other sensor may be used for landing the drone and maintaining a fixed height during a hovering operation.

Alternatively, when the drone 70 is used to direct a targeted VRU to safety, the camera 81 and the ultrasonic sensor 82 may be used to sense the position and motion of the targeted VRU to ensure that the drone 70 does not contact the targeted VRU, and that the targeted VRU is moving away from the risk scenario. The camera 81 and the ultrasonic sensor 82 may also be used to identify other objects in the instructed flight path of the drone 70 so that the drone 70 may avoid such objects in the flight. Alternatively, or in addition to using the camera 81 and the ultrasonic sensor 82, the GPS receiver 79 and the flight sensors 80 may be used while the drone 70 is in flight for collision avoidance.

The drone 70 may also include a display 83 and/or a speaker 85 for outputting additional visual and audible warnings and instructions to a targeted VRU.

The display 83 may be a high tech or low tech display. For example, the display 83 may be a printed banner or sign with a warning message, symbol, or instructions. Alternatively, the display 83 may be an electronic display that can display a video message, symbol, instruction, animation, or video that warns a targeted VRU of danger. The display 83 may include a display motor/actuator 84 that can position the display for appropriate viewing by a targeted VRU. For example, the display 83 may be positioned in a first position when the drone 70 is in flight for better aerodynamics while flying. The controller 71 may then control the display motor 84 to position the display 83 in a second position for best viewing by the targeted VRU as the drone 70 approaches the targeted VRU. In other words, the display motor 84 can change the position of the display 83 to better fly and land the drone, and then reposition the display 83 for better visibility by the targeted VRU. The instructions from the RSU 20 may include instructions for changing the position of the display. For example, the instructions may indicate it will take x amount of time for the drone 70 to reach the targeted VRU. At x–1 time, the instructions may indicate controlling the display motor 84 to change the position of the display 83 from the first position to the second position for viewing by the VRU. At x+y time, the instructions may indicate controlling the display motor 84 to change the position of the display 83 from the second position to the first position for the return flight to the nest 90. In this example, the example times may be measured in seconds and x and y may be positive natural numbers or some positive fractional component thereof.

Messages displayed by the focused light display 64 and by the display 83 of the drone 70 should be short and direct to evoke a rapid response by the VRU.

While the holosonic speaker 62, the focused light display 64, and the drone 70 were described as warning devices 60, the warning devices of the intersection infrastructure warning system are not limited to these warning devices 60. Other warning systems providing different sensory stimulation to a VRU may deployed. For example, the warning device 60 may output a stream or burst of jetted fluid such as air or water. As such, the warning device 60 may be a jetted fluid output device. In extreme situations where a VRU may be sensory impaired, for example, by wearing headphones and listening to loud music, the sensory impairment of the VRU may be identified by the edge computing device 10 so as to output a warning commensurate to the VRU's impairment. In some instances, a jetted fluid output device may be used to output a jetted stream of fluid get the attention of a VRU by affecting non-impaired senses of the VRU. While a VRU may be annoyed with being hit by an air or water stream from a jetted fluid output warning device, such annoyance may be better than a collision with a vehicle.

With reference to FIG. 4, an example intersection 100 where the infrastructure warning device 1 can be used is illustrated. The intersection 100 includes traffic control signals 102, pedestrian control signals 104, marked pedestrian crossing points (e.g., crosswalks) 106, and stop lines 108 for controlling the flow of pedestrians 120, cyclists 122, and motor vehicles 130 (collectively referred to as "road users"). The intersection 100 also includes the elements of the intersection infrastructure warning system 1 including the RSU 20 (not shown) housed in the traffic cabinet 21 mounted on a utility pole 103, the sensor arrays 50 (not shown) in housings 58, and the drones 70. In the example intersection warning infrastructure 1 shown in FIG. 4, the drones 70 are used as the warning device 60. The nests 90 for the drones 70 may include individual support poles 94. However, the nests 90 may also be installed on existing intersection infrastructure like utility pole 103.

While a four-way intersection is shown in FIG. 4, the infrastructure warning system 1 may also be used at more complex intersections with a greater number of junction roads, at roundabouts, and at intersections with less junction roads (e.g., three-way intersections).

The RSU 20 can determine the status of the traffic control signals 102 and the pedestrian control signals 104 through a wired or wireless connection. That is, the RSU 20 is configured to receive SPaT messages from the control signals 102 and 104 to determine the status of the control signals 102 and 104. Alternatively, the RSU 20 may determine the status of the control signals 102 and 104 by the cameras 52.

The image and motion data acquired by the sensor arrays 50 is used by the RSU 20 with AI algorithms to determine the predicted trajectories and paths of the road users 120, 122, and 130. That is, the sensor arrays 50 collect data to detect, localize, and track all road users 120, 122, and 130 in and around the intersection 100. The RSU 20 may use image processing and machine vision to identify and track the road users 120, 122, and 130. As shown in FIG. 4, the RSU 20 may superimpose boxes 140 on captured video from the cameras 52 to identify and track the road users 120, 122, and 130 around the intersection 100. The RSU 20 can then use the detection and ranging sensors 54 to acquire measurements for determining the spatial-temporal data of the road users 120, 122, and 130 such as trajectory, path, direction, speed, and acceleration The data acquired by the sensor arrays 50 can be used by the RSU 20 to compute proxy basic safety messages (BSMs) from the motor vehicles 130 and to compute proxy personal safety messages (PSMs) for the pedestrians 120 and cyclists 122 (i.e., the vulnerable road users (VRUs)). That is, the RSU 20 can compute proxy spatial-temporal data for the road users 120, 122, and 130 in lieu sensors on the road users gathering the spatial-temporal data. The RSU 20 can then use the proxy spatial-temporal data with AI algorithms to predict the trajectories, paths, intent, and behavior patterns of the road users 120, 122, and 130.

The proxy BSMs calculated by the RSU 20 may include a subject vehicle's speed and acceleration in addition to the subject vehicle's distance to the stop line 108, the distance from the subject vehicle to a lead vehicle (i.e., a vehicle traveling in front of the subject vehicle), the velocity and acceleration of the lead vehicle, the heading or steering angle of the subject vehicle, and the status of the traffic control signal 102. The proxy BSMs for the vehicles 130 can be used with AI algorithms by the GPU 22 to predict the trajectories and driving behavior of the motor vehicles 130. Alternatively, vehicles having dedicated short-range communications (DRSC) and connected to vehicle-to-everything (V2X) systems may transmit CAN data from vehicle sensors including velocity, throttle opening rate, brake pressure, and steering angle to communicate a BSM to the RSU 20 via the communication module 30. The CAN data from connected vehicles can be used with AI algorithms in addition to the proxy BSMs calculated by the RSU 20 to predict the trajectories and driving behavior of the connected vehicles 130.

The proxy PSMs calculated by the RSU 20 may include the speed, acceleration, and travel direction of the pedestrians 120 and cyclists 122 in addition to speed and acceleration data for other pedestrians and cyclists around the subject pedestrians and cyclists, and the status of traffic control signals 102 and pedestrian control signals 104. The proxy PSMs for the pedestrians 120 and cyclists 122 can be used by the GPU 22 with AI algorithms to predict the paths, trajectories, intent, and behavior of the pedestrians 120 and the cyclists 122. Alternatively, for pedestrians 120 and cyclists 122 that are connected to the V2X system via a cell phone or other personal communication device, data acquired from the phone or other personal communication device related to the pedestrian's 120 and cyclist's 122 speed, acceleration, and travel direction can be used to communicate a PSM of the pedestrian 120 or cyclist 122 to the RSU 20 via the communication module 130. The speed, acceleration, and travel direction data from the connected pedestrian 120 or cyclist 122 can be used with AI algorithms in addition to the proxy PSMs calculated by the RSU 20 to predict trajectories, paths, and spatial-temporal behaviors of the connected pedestrians 120 or cyclists 122. The other personal communication device could be a wearable communications or computing device using ultra wide band (UWB) technology with a unified communication and location system that allows for the localization of the other personal communication device with an accuracy of within ten centimeters or less. The other personal communication device with UWB technology may also be enabled for high speed communication measured in microseconds or nanoseconds. The high speed communication and more precise localization of a personal communication device using UWB may used for quickly acquiring data from the pedestrians 120 and the cyclists 122 for calculating a proxy PSM.

The predicted trajectories, paths, and behaviors of the road users 120, 122, and 130 are derived for the VRUs 120 and 122 using the spatial-temporal data in the proxy PSM and broadcast PSM data, and derived for the vehicles 130 using the spatial-temporal data in the proxy BSM and broadcast BSM data. The GPU 22 then uses an AI algorithm to further process the spatial-temporal data for each respective PSM/BSM to derive behavior intent and predict speed, trajectory, path, heading with an extended time horizon greater than three second (i.e., >3 sec). The GPU 22 then uses an AI algorithm to process the VRU data for the VRUs 120 and 122 and the vehicle data for the vehicles 130 to localize which of the vehicles 130 around the intersection 100 pose threats to the VRUs 120 and 122 around the intersection 100.

For connected vehicles 130, that is, vehicles 130 having DSRC and connected to the V2X system, a unique vehicle ID may be used by the AI algorithm executed by the GPU 22 to identify which vehicles 130 pose risks to the VRUs 120 and 122, and then the GPU 22 correlates such risk to the at-risk VRUs 120 and 122. In such manner, the RSU 20 may only output alert messages to the connected vehicles 130 posing a risk to the VRUs (i.e., targeted vehicles 130) so that other connected vehicles 130 around the intersection 100 (i.e., non-risk or non-targeted vehicles 130) are not distracted by the alert message. The alert message output by the RSU 20 to the targeted vehicles 130 may cause an alert or display message to appear on the instrument panel, infotainment display, or head-up display of the targeted vehicle 130. The alert message may also cause a warning light or directional arrow pointing in the direction of the at-risk VRU to appear on a side view mirror or A-pillar of the targeted vehicle 130 to alert the driver to the possibility of a collision with the at-risk VRUs 120 and 122. Alternatively, or in addition to the visual warning in the connected vehicle 130, the alert message output by the RSU 20 may cause the speakers of the vehicle's infotainment device to output speech or a warning sound to alert the driver of the vehicle 130 to the possibility of a collision with the at-risk VRUs 120 and 122.

The GPU 22 may assign some other identification to non-connected vehicles 130 when the proxy BSM for such vehicles is processed and analyzed by the edge computing device 10. However, the RSU 20 of the intersection infrastructure warning system 1 may not be able to output targeted, in-vehicle alert messages to non-connected vehicles 130 (i.e., vehicles 130 without DSRC and not connected to V2X systems).

The predicted trajectories and paths of the road users 120, 122, and 130 can be further analyzed, for example, by comparing these trajectories and paths to trained models based on past data acquired by the sensor array 50 and calculated by the cloud 40. The trained models calculated by the cloud 40 are periodically updated using the data acquired by the sensor array 50.

After the RSU 20 identifies the vehicles 130 around the intersection 100 that pose a risk to the VRUs 120 and 122 at the intersection 100, the RSU 20 can output targeting instructions to the warning devices 60 to warn the at-risk VRUs 120 and 122 (i.e., the targeted VRUs 120 and 122). In this example embodiment shown in FIG. 4, the RSU 20 outputs flight instructions to one or more drones 70 at the intersection 100 to deploy the drones 70 and warn the targeted VRUs 120 and 122.

Figure 5:
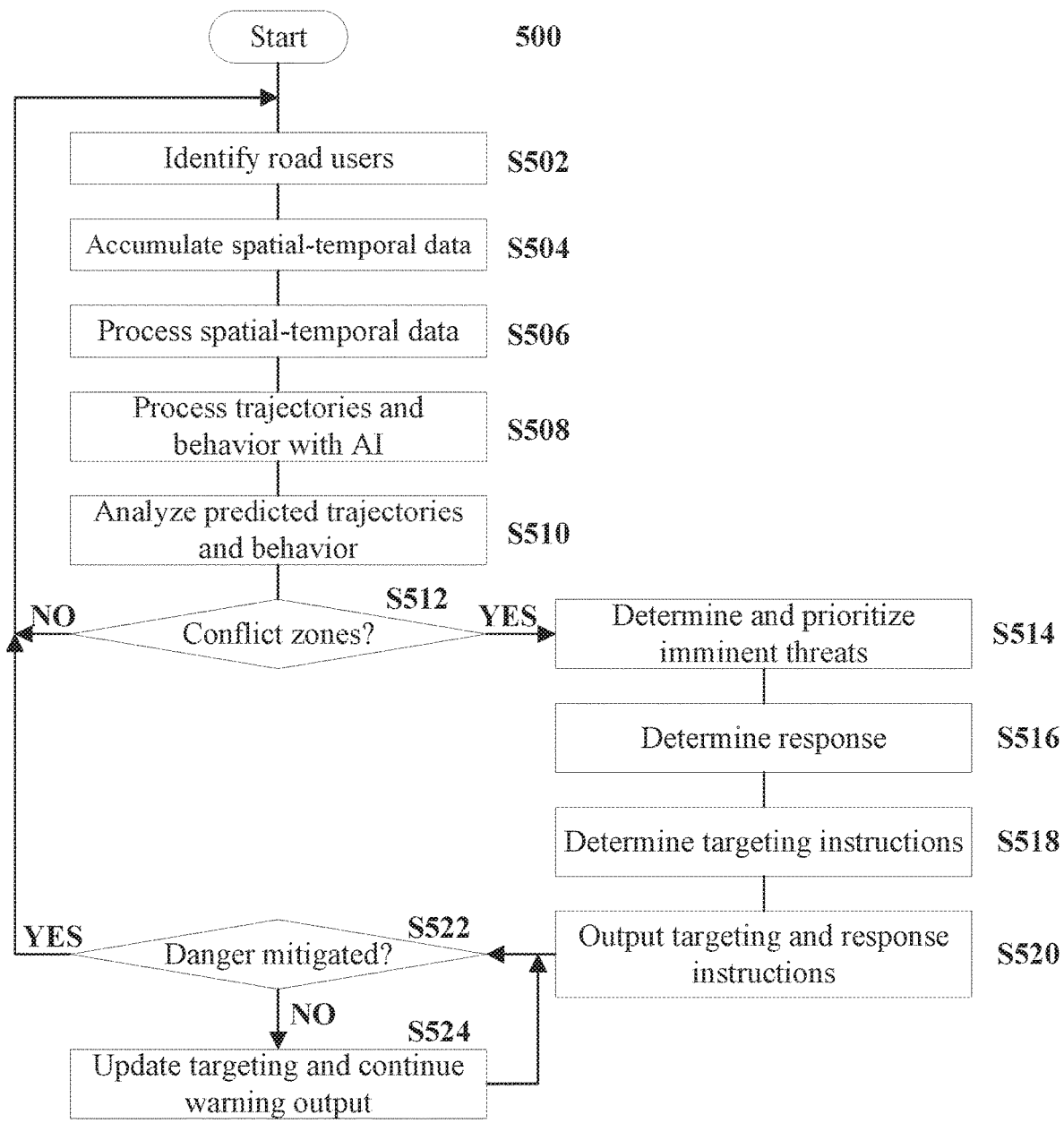
FIG. 5 is a flowchart illustrating a process flow for processes performed by an edge computing device.

A process flow 500 for the processes performed by the edge computing device 10 is described with reference to the flowchart in FIG. 5.

At S502, the edge computing device 10 uses machine vision algorithms to process image data from the cameras to detect and track all road users around an intersection. The edge computing device 10 may also use measurements from the detection and ranging sensor 54 to detect road users around the intersection. The edge computing device 10 continues to track all the road users around the intersection so long as the road users are in range of the sensor array 50 (i.e., approximately 200 meters).

At S504, the edge computing device 10 continuously acquires data from the sensors 52 and 54 as the basis for calculating spatial-temporal data for each road user such as trajectory, path, direction, bearing, heading, azimuth, speed, and acceleration, in addition to identifying spatial-temporal behavior for all the tracked road users.

At S504, the edge computing device 10 may also acquire BSM and PSM messages from tracked road users connected to the intersection infrastructure warning system 1 via V2X devices and systems. The GPU 22 may use the BSM and PSM messages as the basis for calculating the spatial-temporal data for the connected road users in addition to using the respective data of the connected road users acquired by the sensors 52 and 54.

At S506, the GPU 22 of the edge computing device 10 processes the spatial-temporal data acquired at S504 for all the tracked road users to calculate the current paths, trajectories, directions, bearings, headings, azimuths, speeds, and accelerations for all the tracked road users, in addition to identifying the spatial-temporal behaviors for all the tracked road users.

At S508, the GPU 22 further processes the calculated spatial-temporal data and spatial-temporal behaviors for all the tracked road users using AI algorithms to predict the paths, trajectories, intents, and spatial-temporal behaviors for all the tracked road users.

At S510, the GPU 22 further analyzes the calculated spatial-temporal data and identified behavior for all the tracked road users with the predicted paths, trajectories, intents, and spatial-temporal behaviors of all the road users using AI algorithms along multiple trajectories. That is, the edge computing device 10 may calculate predictions for each of the road users along multiple trajectories. The multiple trajectory analysis for each of the road users is further analyzed for predicted convergences between the road users that pose imminent threat interactions (e.g., collisions with a VRU) to identify conflict zones.

At S512, if the GPU 22 does not identify any conflict zones, the process returns to S502 and repeats. If the GPU 22 identifies conflict zones, i.e., "YES" at S512, the process proceeds to S514.

At S514, the edge computing device 10 determines and prioritizes imminent threats. The determination process includes identifying the VRUs in conflict zones, the threats to the VRUs in the conflict zones, and the time horizons of the threats to the VRUs in the conflict zones. For example, the GPU 22 may identify a particular VRU, the threat to the VRU, and the time until the threat occurs to the VRU. The GPU 22 then ranks all the threats on the basis of the threat and the time horizon. For example, for a particular VRU, the GPU 22 may identify the threat is a side impact to the VRU with a seven second time horizon. The GPU 22 may then classify this threat by assigning a threat level such as low, medium, or high, or some other identifier like a number. The edge computing device 10 may use a predetermined threat matrix, lookup table, or other index fetched from the storage 26 to more quickly correlate the threat and time horizon with a threat level. The responses to threats may then be ranked and prioritized by the GPU 22 based on the threat level. For example, the edge computing device 10 may prioritize a response to a threat with a high threat level over a response to a threat with a lower threat level.

The threat level and predicted time horizons related to the threats may facilitate warning responses customized for each VRU 120 and the predicted risk determined by the GPU 22 for each VRU 120. For example, the warning response may be to warn one or more VRUs 120 to move left, right, diagonally backward, or to turn around and run, to avoid danger.

At S516, the edge computing device 10 determines a response on the basis of the threat and threat level. That is, the edge computing device 10 selects a warning device 60 and determines the output of the warning device based on the threat and the threat level. For example, the edge computing device 10 may determine at S514 that a side impact threat to a VRU with a seven second horizon has a low threat level. In response, the edge computing device may deploy a drone 70 to fly to the VRU head on and display a message "step back" on the display 83 of the drone 70. Like the threat prioritization, the edge computing device 10 may use a predetermined matrix, lookup table, or other index fetched from the storage 26 to correlate the threat and threat level to a response, in lieu of the GPU 22 having to perform extra processing to determine the best response.

Figure 6:
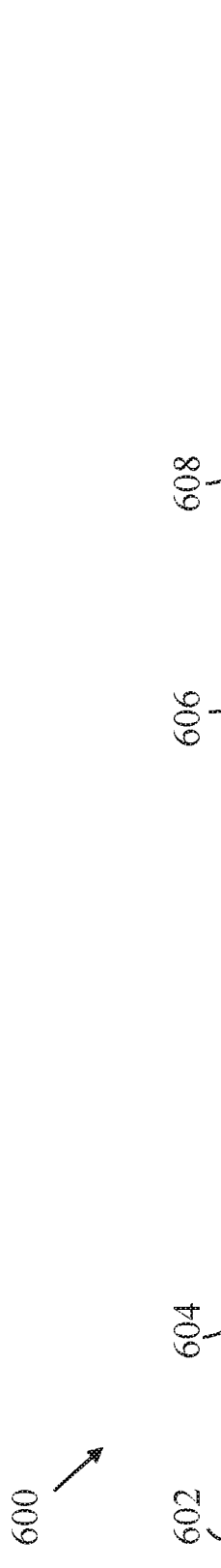
FIG. 6 is an example warning response matrix.

With reference to FIG. 6, an example warning response matrix 600 is illustrated. A matrix, lookup table, or other index may be stored in the storage 26 and used by the edge computing device 10 to quickly prioritize threats and determine a response. The response matrix 600 may include a threat ranking 602, a characterization of the threat to the VRU 604, a threat level 606, and a characterization of the response 608.

The threat ranking 602, threat 604, and threat level 606 are determined by the edge computing device at S514. However, the warning response matrix 600 may be used by the edge computing device 10 to more quickly correlate the identified threat with a threat level by storing predetermined correlations in the form of a matrix or lookup table in the storage 26. In this case, once the edge computing device 10 determines the threat at S514, a matrix can be used to correlate the threat 604 to a threat level 606 without the edge computing device 10 having to perform extra processing to make a threat level determination. A plurality of threats 604 can then be ranked based on the threat level 606.

The threats 604 can also be correlated to a response 608 so that the edge computing device 10 can use the warning response matrix 600 in lieu of having to determine a response. Such correlations can eliminate unnecessary processing by the edge computing device 10 to provide an even faster real-time response. Such correlations also ensure consistency in the response to the threats. Consistent responses may familiarize the road users with the warnings from the intersection infrastructure warning system 1 and increase the users' trust in the warnings and the warning system 1.

The edge computing device 10 may use the characterization of the response 608 as response instructions for the warning device 60 in lieu of having to having to perform extra processing to determine the best response. That is, the edge computing device 10 may translate the response characterization 608 into machine instructions and output such machine instructions as targeting and response instructions to the warning devices 60.

In the example shown in FIG. 6, the edge computing device 10 outputs response instructions 608 to one or more drones 70. However, warning response matrixes 600 may include additional threat characterizations and response characterizations, including the deployment of different warning devices 60 to warn a VRU of danger. The degrees of freedom based on the number of threat scenarios will determine the configuration of any warning response matrix, lookup table, or other index.

Alternatively, data accumulated by the RSU 20 may be sent to the cloud 40 for modeling and simulation. That is, the cloud 40 of the edge computing device 10 can develop trained models using a wide-range of different simulated threat and response scenarios. These models may be used by the edge computing device 10 to determine a warning response matrix 600 or used in combination with actual threat and response scenarios to develop the warning and response matrix 600.

With reference again to FIG. 5, at S518, the edge computing device 10 determines targeting instructions for the warning device 60 used in the response determined by the edge computing device 10 at S516. The edge computing device 10 may use the calculated spatial-temporal data and calculated predictions to precisely target the warning device 60 on the VRU. For example, based on the known spatial-temporal data of the VRU calculated by the GPU 22 at S506 and the predicted path, behavior, and intent of the VRU determined by the GPU 22 at S508, the edge computing device 10 can determine the position of the VRU at any given time to ensure that the warning device 60 is precisely targeted on the VRU.

For the holosonic speaker 62 and the focused light display 64 warning devices 60 that may be used with a PT device 55, the targeting instructions from the edge computing device 10 may include the instructions to the controllers 56 to control the rotation and tilt of the PT device 55 to aim the output of the warning device 60 at the VRU.

For the drones 70, the targeting instructions from the edge computing device 10 may be flight instructions with the flight path the drone 70 should fly to approach the VRU.

At S520, the edge computing device 10 outputs the targeting and response instructions to the warning devices 60 and the warning devices 60 warn the VRU.

At S522, the edge computing device 10 determines whether the warning devices 60 have mitigated the danger. That is, the edge computing device 10 may determine whether the danger is still ongoing and/or may determine whether the warning devices 60 have been successful in warning the VRU to mitigate the danger. If the edge computing device 10 determines that the danger has not been ameliorated, i.e., "NO" at S522, the process proceeds to S524.

At S524 the edge device 10 may update and output revised targeting and/or response instructions, if necessary, until the edge device determines that the danger has been mitigated at S522.

When the edge computing device 10 determines that the warning devices 60 have mitigated the danger at S522, the process proceeds back to S502. The process 500 by the edge computing device 10 is a continuous monitoring and response process.

The edge computing device 10 may output complete instructions at S520 without the feedback processes of S522 and S524. That is, the edge computing device 10 may output targeting and response instructions to the warning device 60 with additional instructions including time instructions for completing the warning response and return instructions for the warning device 60. For example, in determining the time horizon of the threat at S514, the edge computing device 10 may additionally determine that the threat to the VRU will pass after x amount of time (i.e., the VRU will no longer be in danger after x amount of time). At S516, the response instructions to the warning device 60 may include executing return instructions after the x amount of time has elapsed. That is, if the edge computing device 10 determines that a threat will be over in ten seconds, the response instructions to the warning device 60 may include instructions to begin a return process after the ten seconds have elapsed.

For the warning devices 60 using a PT device 55 to provide a targeted output to the VRU, return instructions may be stopping the output of the warning device 60 and instructing the PT device 55 to return to a home position, as determined by the calibration the PT device 55.

For the drone 70, return instructions may include stopping the warning output, adjusting the position of the display 83 for flight, if necessary, and returning to the nest 90. The on-board sensors of the drone 70 may be used for returning to and landing properly on the nest 90, as described above with reference to FIG. 3.

Alternatively, when the edge computing device 10 and the warning devices are configured for real-time updates and include the feedback processes at S522 and S524, the edge computing device 10 may include transmitting return instructions to the warning devices 60 in response to determining the danger has been mitigated at S522. That is, the edge computing device 10 may output return instructions to the warning devices 60 before the process proceeds to S502 to repeat.

Because of the increased computational abilities of the edge computing device 10, the response and targeting instructions are made by the edge computing device 10 in lieu of processing by the controller 56 in the PT device 55 and the controller 71 in the drone 70. This allows the intersection infrastructure warning system 1 to use off-the-shelf devices like the PT device 55 and the drone 70 while limiting modifications to the controllers of these devices.

With reference to FIGS. 7-11, operational examples for example embodiments of the intersection infrastructure warning system 1 at intersection 100 are illustrated and described.

Figure 7:
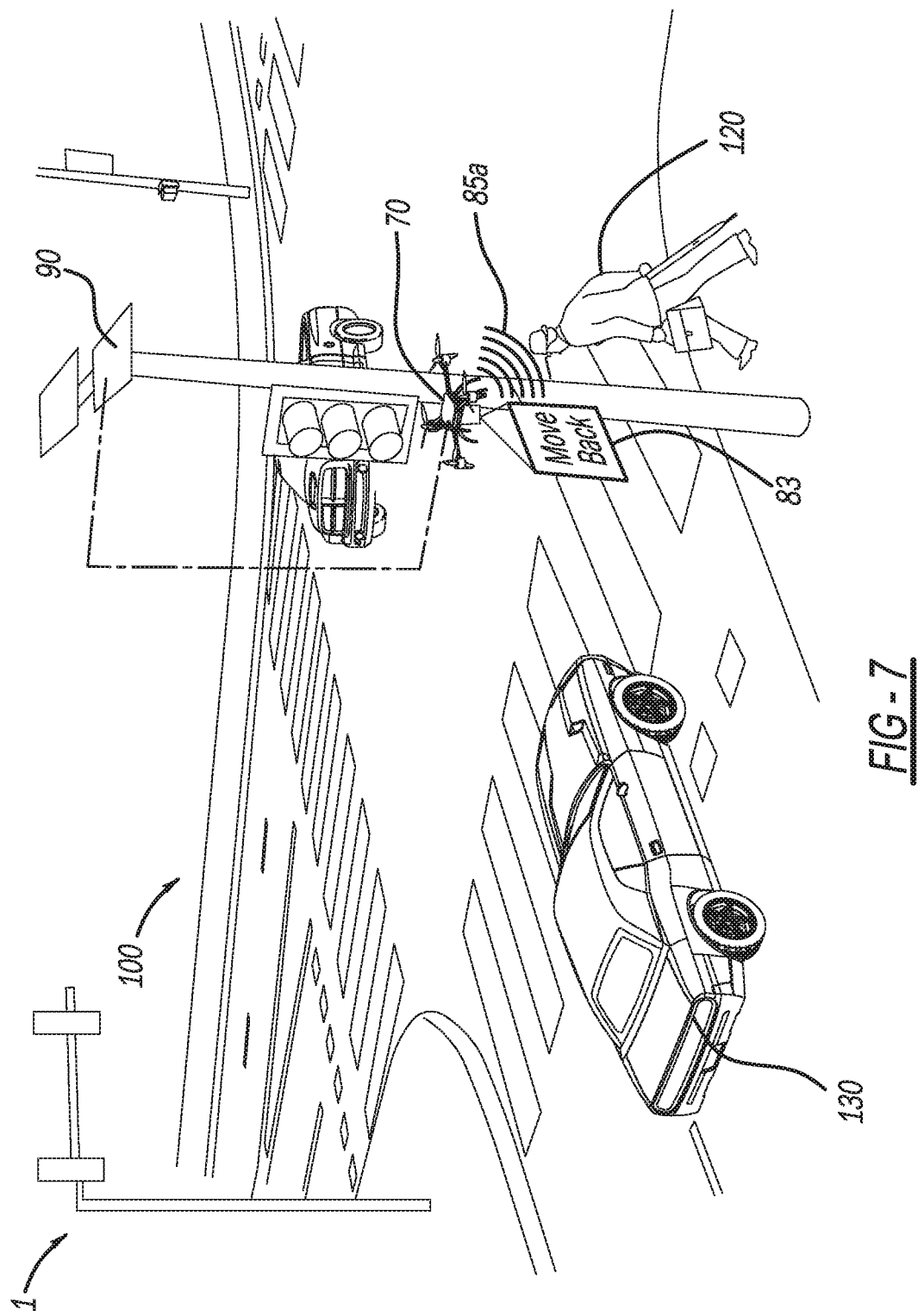
FIG. 7 is a perspective view of an intersection infrastructure warning system illustrating an example operation of one example embodiment.

With reference to FIG. 7, the example intersection infrastructure warning system 1 at intersection 100 includes warning an at-risk VRU 120 by a drone 70 and further risk remediation by the drone 70. After the edge computing device 10 of the infrastructure warning system 1 identifies a vehicle 130 posing a risk to a VRU 120, the edge computing device 10 outputs warning message format, delivery mode, and flight instructions to the drone 70.

The drone 70 then deploys from the nest 90, drops vertically down into the path of the VRU 120, and hovers directly in front of the VRU 120. The drone 70 displays a warning message and outputs an audio warning to alert the VRU 120 of danger from the vehicle 130. In the example shown in FIG. 7, the drone 70 outputs a visual warning to the VRU 120 on the display 83 with "move back" text in addition to outputting an audio warning 85a from the speaker as a recorded message instructing the VRU 120 to "move back."

The drone 70 then maintains a position directly in front of the VRU 120 and avoids contact with the VRU 120 to block forward movement of the VRU 120 to prevent the VRU 120 from walking into danger—in this case, the path of the vehicle 130. The drone 70 may then fly toward the VRU 120, without contacting the VRU 120, in an attempt to direct (i.e., push) the VRU 120 away from the dangerous location in order to remedy the dangerous situation. In this manner, the drone 70 can both warn a targeted VRU 120 and remedy a dangerous situation by directing the targeted VRU 120 away from the danger.

Figure 8:
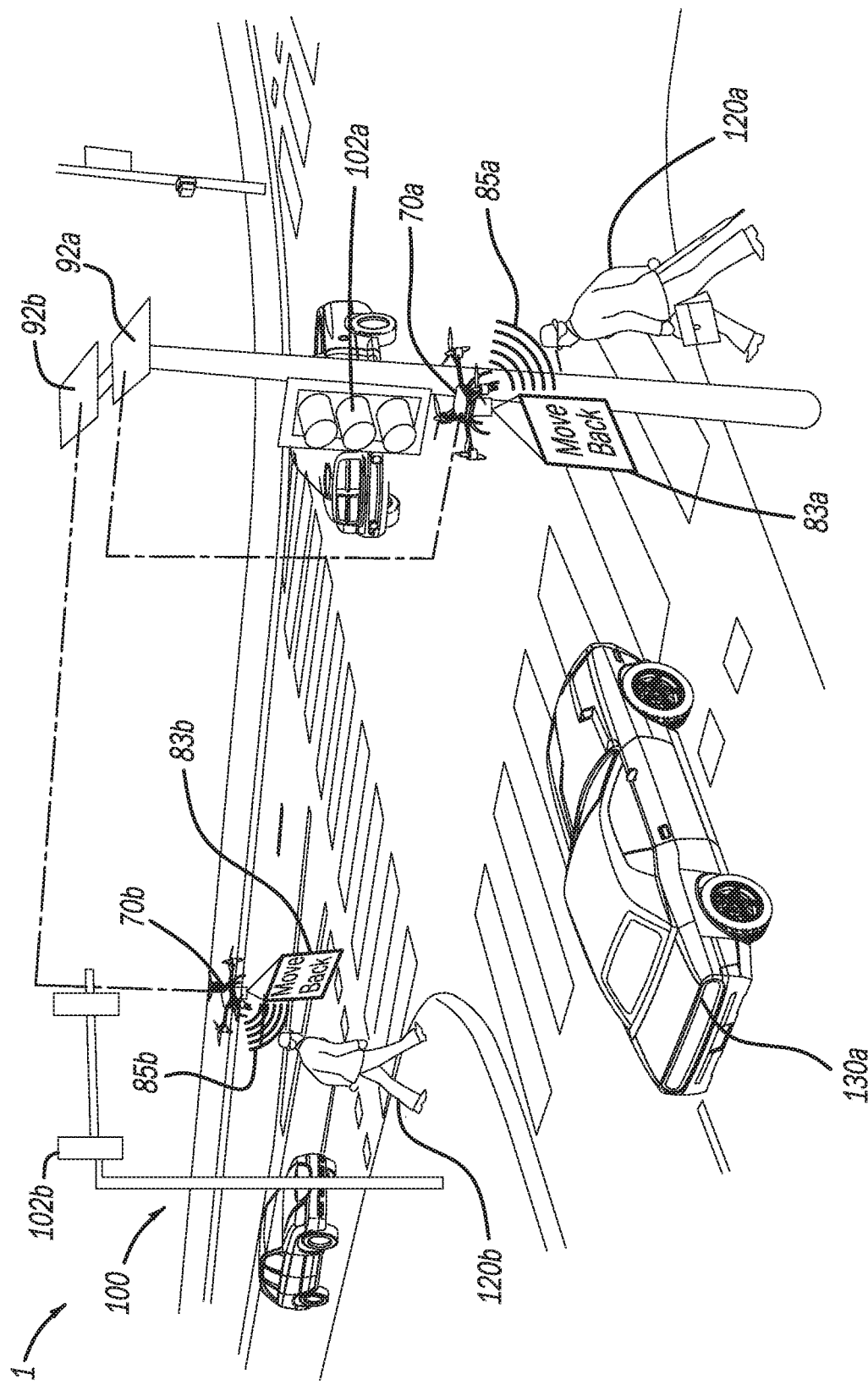
FIG. 8 is a perspective view of an intersection infrastructure warning system illustrating another example operation for another example embodiment.

With reference to FIG. 8, the example intersection infrastructure warning system 1 at intersection 100 includes warning multiple at-risk VRUs 120a and 120b using multiple drones 70a and 70b with further risk remediation by the drones 70a and 70b. For example, in the situation shown in FIG. 8, the edge computing device 10 may predict the VRU 120a as eager to cross the road in anticipation of the control signal 102a changing from yellow to red, while also predicting that the vehicle 130a will not stop or slow down despite the change of the control signal 102a from yellow to red (i.e., predicting the vehicle 130a will run a red light). In this case, the VRU 120a may run into the path of vehicle 130a. Similarly, the edge computing device 10 may analyze the running VRU 120b and predict the VRU 120b will try to cross the intersection despite the control signal 102a changing from yellow to red. The edge computing device 10 may also predict that driver of the vehicle 130b is anticipating the change of the control signal 102b from red to green and may avoid braking to slow to complete stop. In this case, the vehicle 130b may not brake, or late brake, which the edge computing device 10 may identify as causing a predicted collision with the running VRU 120b.

After the edge computing device 10 of the infrastructure warning system 1 identifies the vehicle 130a posing a risk to the VRU 120a and the vehicle 130b posing a risk to the VRU 120b, the edge computing device 10 outputs respective warning message formats, delivery modes, and flight instructions (i.e., response and targeting instructions) to the drones 70a and 70b.

The drone 70a then deploys from the nest 90a located immediately overhead of the VRU 120a, similar to the flight of the drone described with reference to FIG. 7. That is, the drone 70a may drop from nest 90a, fly toward, and hover in front of the VRU 120a to block the path of the VRU 120a. The drone 70a may display a "stop" warning message on the display 83a and output an audio warning 85a from the speaker instructing the VRU 120a to "stop."

The drone 70a continues to hover to maintain a position directly in front of the VRU 120a and avoids contact with the VRU 120a to block the forward movement of the VRU 120a and prevent the VRU 120a from walking into danger—in this case, the path of the vehicle 130a. The drone 70a may then fly toward the VRU 120a, without contacting the VRU 120a, in an attempt to direct (i.e., push) the VRU 120a away from the danger to remedy the dangerous situation.

Similarly, the drone 70b may deploy from the nest 90b, fly across the street, and drop (i.e., fly downward) to block the path of the VRU 120b. The drone 70b may display a "move back" warning message on the display 83b and output an audio warning 85b from the speaker instructing the VRU 120b to "move back."

The drone 70b then continues to hover to maintain a position directly in front of the VRU 120b, avoiding contact with the VRU 120b, to block forward movement of the VRU 120b and prevent the VRU 120b from walking into danger—in this case, the path of the vehicle 130b. The drone 70b may then fly toward the VRU 120b, without contacting the VRU

120b, in an attempt to direct (i.e., push) the VRU 120b away from the danger to remedy the dangerous situation.

In this manner, the drones 70a and 70b can respectively warn the targeted VRUs 120a and 120b and also remedy dangerous situations by directing the targeted VRUs 120a and 120b away from the danger.

While the example shown in FIG. 8 shows two drones 70a and 70b deploying from two nests 90a and 90b, any number of drones 70 and nests 90 may be used. For example, the drones 70a and 70b may both deploy from a single nest (e.g., the nest 90a). In another example, the intersection 100 may include a nest 90 on each corner of the intersection 100 with one or more drones 70 deploying from each nest. In this manner, the drones 70 may be able to immediately drop from overhead nests 90 to more quickly alert and block the forward travel of a VRU 120.

Figure 9:
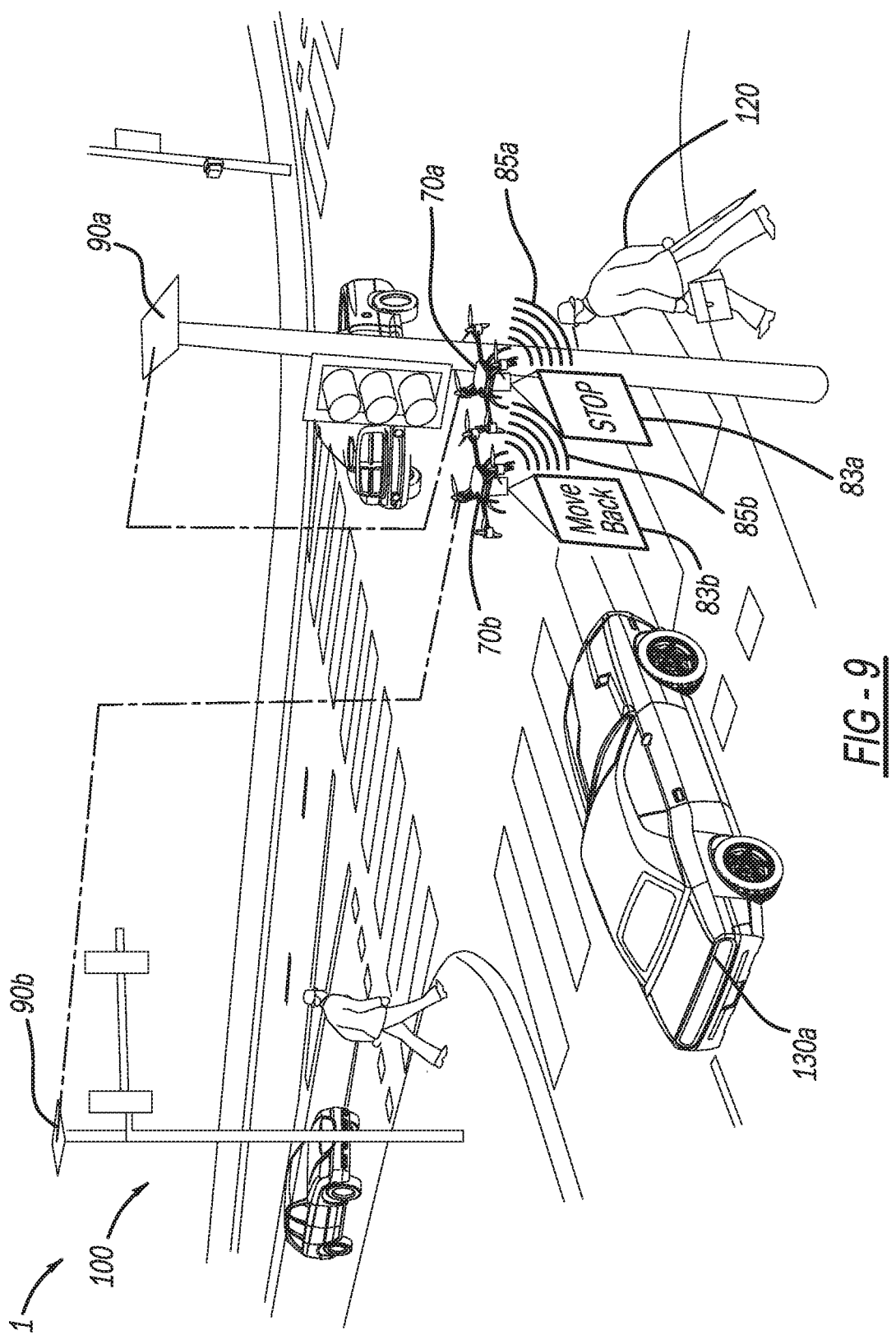
FIG. 9 is a perspective view of an intersection infrastructure warning system illustrating another example operation for another example embodiment.

With reference to FIG. 9, the example intersection infrastructure warning system 1 at intersection 100 includes warning an at-risk VRU 120 using multiple drones 70a and 70b with further risk remediation by the drones 70a and 70b. For example, the VRU 120 at intersection 100 may be heavily distracted by the display of a smart phone device with further sensory impairment from the audio output of the smart phone device via headphones. In such an example, the hearing of the VRU 120 may be impaired by the headphones such that the VRU 120 may not be able to perceive audio warnings from the vehicle 130 or the drone 70a, while the user is otherwise engaged in the display of the smart phone device and oblivious to his surroundings. The sensory impairment of the VRU 120 may be so great that the VRU 120 may not realize he is walking into danger despite warnings from one drone 70a. In this example, the edge computing device 10 may predict, based on the spatial-temporal data and behavior of the VRU acquired by the sensors, that the VRU 120 will continue walking into the intersection 100 without heeding the pedestrian control signals. In another example, based on the threat and warning matrix in FIG. 6, the edge computing device 10 may determine that the vehicle 130 is exceeding the speed limit and predict a side collision between the VRU 120 and the vehicle 130 with only a three second horizon for warning the VRU 120. In this example, the edge computing device 10 may deploy both the drones 70a and 70b to warn the VRU 120 of danger. In both examples, the edge computing device 10 may deploy a second drone 70b in conjunction with a first drone 70a to warn the VRU 120 of danger and mitigate the dangerous situation.

After the edge computing device 10 of the infrastructure warning system 1 identifies the vehicle 130 posing a risk to the VRU 120, the edge computing device 10 outputs a warning message format, a delivery mode, and flight instructions to at least the drone 70a. The edge computing device 10 may simultaneously output a warning message format, a delivery mode, and flight instructions to the drone 70b to deploy both drones 70a and 70b simultaneously. Alternatively, after deploying the drone 70a, the edge computing device, based on the continuously acquired sensor data from the sensor array 50, may determine a change in threat level based on the predictions and determine that additional warnings should be deployed. That is, the edge computing device 10 may instruct the drone 70b to deploy after first deploying the drone 70a.

The drone 70a deploys from the nest 90a located immediately overhead of the VRU 120a, similar to the flight of the drone described with reference to FIG. 7. That is, the drone 70a may drop from nest 90a, fly toward, and hover in front of the VRU 120 to block the walking path of the VRU 120a. The drone 70a may display a "stop" warning message on the display 83a and output an audio warning 85a from the speaker instructing the VRU 120 to "stop."

The drone 70b either simultaneously deploys, or deploys after the deployment of the drone 70a, flies from the nest 90b across the street from the VRU 120, drops to the left side of the VRU 120, and hovers on the side of the VRU 120 next to the drone 70a to block the walking path of the VRU 120. The drone 70b may display a "move back" warning message on the display 83b and output an audio warning 85b from the speaker instructing the VRU 120 to "move back."

The drones 70a and 70b then continue to hover to maintain side-by-side positions in the forward path of the VRU 120, while avoiding contact with the VRU 120, to create a larger barrier for blocking the forward movement of the VRU 120. In this way, the drones 70a and 70b can be instructed to swarm the VRU 120 and overwhelm the senses of the VRU 120 to force the VRU 120 to heed the warnings of the drones 70a and 70b. Alternatively, or in addition to the swarm effect, the drones 70a and 70b can also be used to create a larger wall effect and prevent the VRU 120 from walking into danger—in this case, the path of the vehicle 130. The drones 70a and 70b may then fly toward the VRU 120 in a coordinated manner, without contacting the VRU 120, to direct the VRU 120 away from the danger to remedy the dangerous situation.

While the example of FIG. 9 shows the drone 70b flying from a nest 90b across the street from the VRU 120, other arrangements are possible. For example, the nest 90a may be used to park both drones 70a and 70b such that both drones 70a and 70b deploy from the same nest. That is, multiple drones 70 may deploy from one nest 90. The infrastructure warning system 1 may include nests 90 on each corner of the intersection 100 where each nest 90 hosts one or more drones 70.

The example embodiments described with reference to FIGS. 9 and 10 both use the simultaneous deployment of drones 70a and 70b as a warning device 60. For simultaneous readiness, multiple drones 70 can be strategically placed in nests 90 around an intersection 100 to form "hives" and launched as needed to multiple simultaneous targets. Here, the drones 70 can maintain a full power cell 77 charge, and the controllers 71 of the drones 70 are continually updated with essential intersection road users' (e.g., 120, 122, 130) statuses and flight information along with coordinated cognitive "swarm" policies. That is, multiple drones can be prepared for real-time interventions for single or multiple VRUs 120 to execute unique safety strategies customized to the unique risks and behavior of individual VRUs 120.

Figure 10:
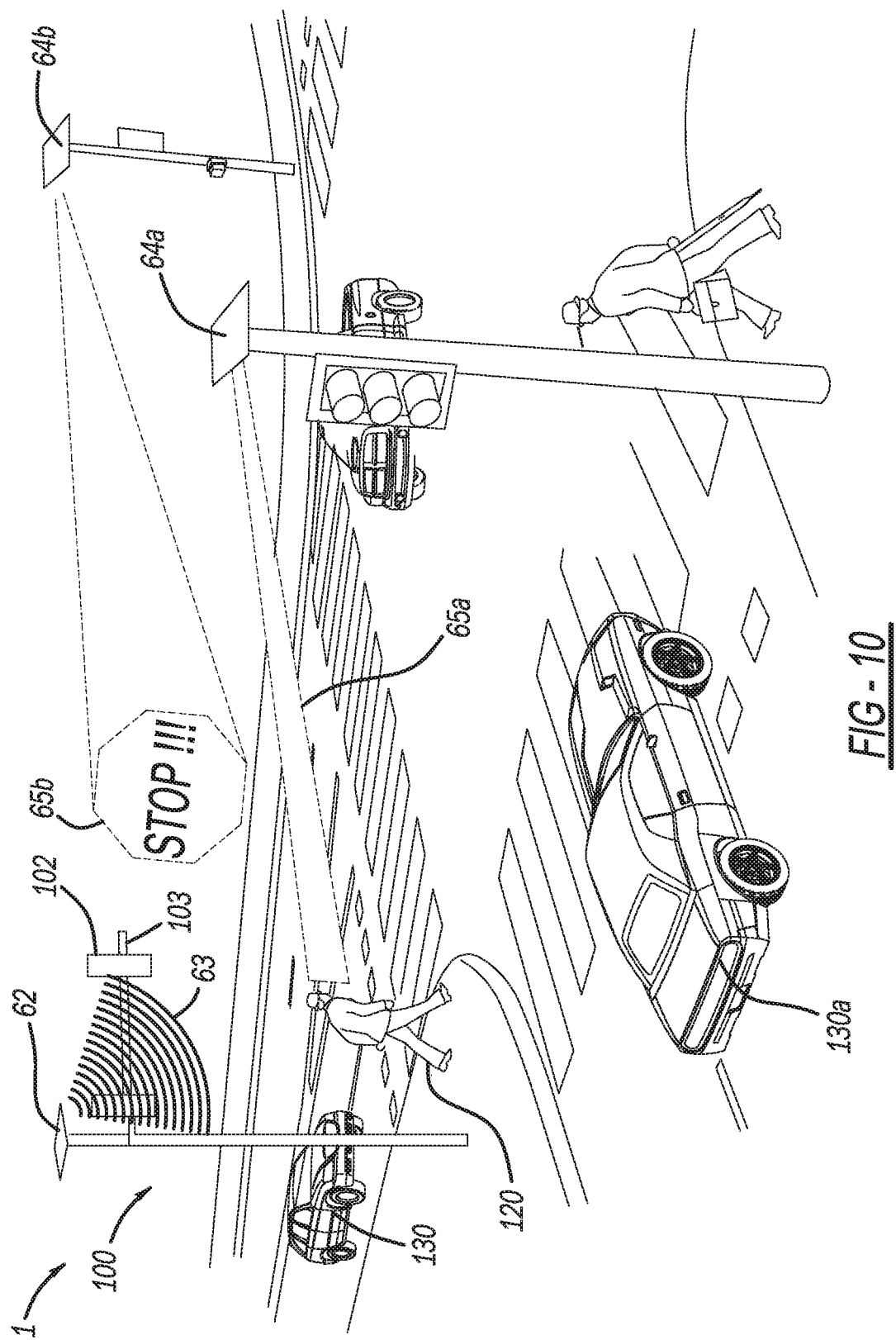
FIG. 10 is a perspective view of an intersection infrastructure warning system illustrating another example operation for another example embodiment.

With reference to FIG. 10, the example intersection infrastructure warning system 1 at intersection 100 includes warning an at-risk VRU 120 using other warning devices 60, such as one or more holosonic speakers 62 and one or more focused light displays 64. The example intersection infrastructure warning system 1 in FIG. 10 warns the VRU 120 of danger from the vehicle 130.

Both the holosonic speakers 62 and the focused light displays 64 may be mounted to the existing mounting structures used by the traffic control signals 102, such as the utility poles 103. In the example embodiment shown in FIG. 10, the speakers 62 and light displays 64 are installed at the tops of the utility poles 103, but the installation position is not limited to this position. The speakers 62 and light displays 64 may be displayed at other locations on the utility poles 103 or may have respective individual utility poles intended only for mounting the speakers 62 and/or the light displays 64, similar to the nest utility poles 94 shown in FIG. 4.

The holosonic speakers 62 and the focused light displays 64 can use the PT device 55 to better aim the outputs of the speakers 62 and light displays 64 for better targeting the VRU 120 with focused sound and light warnings. That is, the speakers 62 and the light displays 64 can be mounted to PT devices 55 and the PT devices 55 can be installed on the utility poles 103. Alternatively, the PT devices 55 may be integrated with the speakers 62 and the light displays 64.

The intersection infrastructure warning system 1 may use one or more holosonic speakers 62 in place of drones to warn the VRU 120 of the vehicle 130. After the edge computing device 10 of the infrastructure warning system 1 identifies the vehicle 130 posing a risk to the VRU 120, the edge computing device 10 outputs an audio warning format and targeting instructions to the holosonic speaker 62. The PT device 55 (or the pan/tilt portion of an integrated speaker design) then rotates and tilts the speaker 62 to aim the output of the speaker 62 toward the VRU 120. The holosonic speaker 62 then outputs a holosonic audio warning 63 to the targeted VRU 120. For example, the holosonic audio warning 63 may be an audio message instructing the VRU 120 to "stop." The holosonic audio warning 63 may be audible only at a specific location. That is, the holosonic audio warning 63 may only be audible immediately around the position of the VRU 120. In this manner, the intersection infrastructure warning system 1 can warn only the targeted VRU 120 while other pedestrians at intersection 100 do not hear the warning 63. Consequently, the other pedestrians are not erroneously warned of danger, which can increase the other pedestrians' trust in the intersection infrastructure warning system 1.

Similarly, the intersection infrastructure warning system 1 may use one or more focused light displays 64 to output a focused light or focused display to warn the VRU 120. After the edge computing device 10 of the infrastructure warning system 1 identifies the vehicle 130 posing a risk to the VRU 120, the edge computing device 10 outputs a visual warning format and targeting instructions to the focused light display 64. The PT device 55 (or the pan/tilt portion of an integrated focused light display design) then rotates and tilts the focused light display 64 to aim the output toward the VRU 120. The focused light display 64 then outputs a targeted (i.e., focused) visual warning 65 to the targeted VRU 120.

For example, the visual warning 65 of the focused light display 64a may be a focused beam of light 65a directed toward the eyes or face of the targeted VRU 120 to get the attention of the targeted VRU 120 and warn the VRU 120 of the vehicle 130.

In another example, the visual warning 65 of the focused light display 64b may be a holographic image of a stop sign 65b instructing the targeted VRU 120 to stop to avoid walking into the path of the vehicle 130.

Similar to the local personalization of the holosonic audio warning 63, the focused visual warnings 65 may be visible only at a specific location. That is, the focused visual warnings 65 may only be visible at the location of the VRU 120 to only alert the targeted VRU 120. In this manner, other pedestrians at the intersection 100 may not be able to see the warnings 65. Consequently, the other pedestrians are not erroneously warned of danger, which can increase the other pedestrians' trust in the intersection infrastructure warning system 1.

While the example intersection infrastructure warning system 1 in FIG. 10 shows one holosonic speaker 62 and two focused light displays 64a and 64b, any number and combination of speakers 62 and displays 64 may be used by the intersection infrastructure warning system 1.

The intersection infrastructure warning system 1 may also employ all of the holosonic speaker 62, the focused light display 64, and the drone 70 as warning devices 60 to warn a targeted VRU 120 of danger. Multiple warning devices 60 and RSUs 20 may be deployed at complex intersections where multiple high risk scenarios are regularly present in order to warn a greater number of VRUs simultaneously.

While the previous example embodiments in FIGS. 7-10 all describe situations where the VRUs 120 were warned at the intersection 100, for example, a VRU 120 crossing at designated crosswalks 106, the intersection infrastructure warning device 1 may also be configured to provide warnings further away from the intersection.

Figure 11:
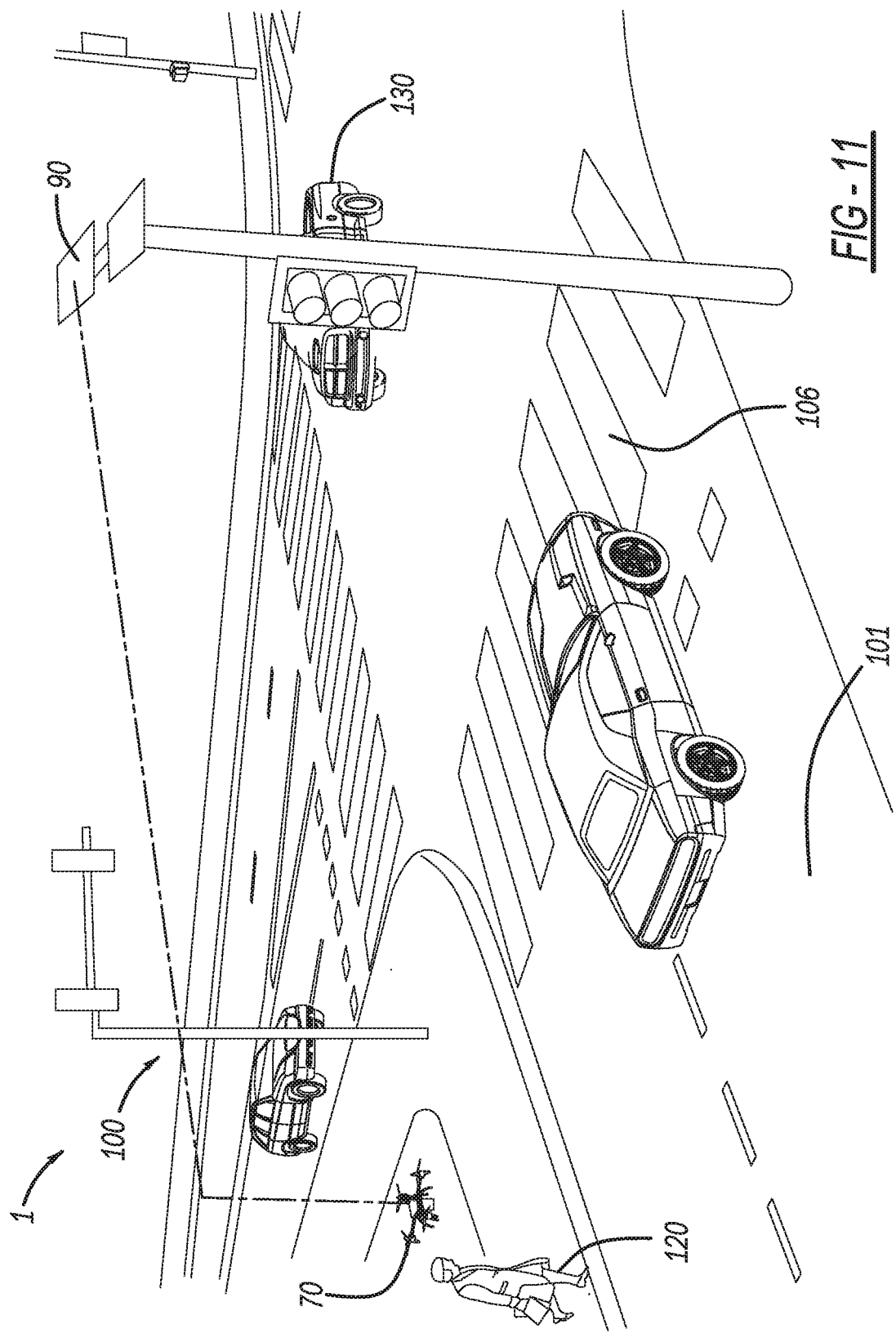
FIG. 11 is a perspective view of an intersection infrastructure warning system illustrating another example operation for another example embodiment.

With reference to FIG. 11, the example intersection infrastructure warning system 1 at intersection 100 includes warning a VRUs 120 at a hundred meter distance from the intersection 100 using a drone 70 with further risk remediation by the drone 70. For example, in the example situation shown in FIG. 11, the sensor array 50 may be configured to track and acquire data for the VRU 120 up to distances of two hundred meters from the intersection 100. In this example, the VRU 120 is a jaywalker crossing the road 101 one hundred meters away from the intersection 100. For example, a school located directly across the road 101 from the VRU 120 may cause the VRU 120 to jaywalk in lieu walking a further one hundred meters to the intersection 100 to cross the road 101 at the crosswalk 106, and then walking another one hundred meters on the other side of the road 101 to arrive at the school. School children may find the extra walking to the intersection 100 to cross the road 101 at the crosswalk 106 to be inconvenient and bothersome. Moreover, if many school children jaywalk on the road 101, it may make other children think that jaywalking is acceptable and encourage a greater number of children to jaywalk on the road 101. Young school children may not appreciate the short time it may take for a vehicle 130 to travel one hundred meters. For example, if the vehicle 130 is speeding and driving at a speed of fifteen mph over a forty-five mph speed limit (i.e., sixty mph), it may take the vehicle 130 approximately four seconds to travel one hundred meters. A vehicle 130 traveling the speed limit of forty-five mph may travel one hundred meters in about five seconds. Young children may not appreciate or understand speed and distance and have a false sense that a speeding vehicle 130 is at a safe distance for crossing the road 101. As such, the intersection infrastructure warning system 1 may also be used to provide warning to jaywalking VRUs 120 crossing roads away from the intersection 100.

In the example of FIG. 11, the edge computing device 10 may predict that the VRU 120 will jaywalk across the road 101, while also determining that the vehicle 130 will not stop or slow down for the jaywalking VRU 120. In this case, the edge computing device 100 may predict that the VRU 120 may walk into the path of the vehicle 130 causing a collision between the VRU 120 and the vehicle 130.

After the edge computing device 10 of the infrastructure warning system 1 identifies the vehicle 130 posing a risk to the VRU 120, the edge computing device 10 outputs respective warning message formats, delivery modes, and flight instructions (i.e., response and targeting instructions) to the drone 70.

The drone 70 then deploys from the nest 90, flies along the road 101, and drops to block the path of the VRU 120 trying to cross the road 101. That is, the drone 70 may fly from the nest 90 toward the VRU 120, drop, and then hover in front of the VRU 120 to block the walking path of the VRU 120. As in the above-described example embodiments, the warning output of the drone may be based on the threat level and the threat ranking. In this example, the drone 70 may hover, avoiding contact with the VRU 120, to block the path of the VRU 120 to prevent the VRU 120 from jaywalking across the road 101.

The drone 70 may then attempt to direct the VRU 120 to the intersection 100 to cross the road 101 at the crosswalk 106.

The RSU 20 may periodically output stored spatial-temporal data from the storage 26 to the cloud 40 for further processing. In the example shown in FIG. 11, trained models and simulations by the cloud 40 can be used by the intersection infrastructure warning system 1 to better determine popular jaywalking locations on roads near the intersection 100. Trained models from the cloud 40 can be used to better warn jaywalking VRUs 120.

The example intersection infrastructure warning system 1 in FIG. 11 may also be configured to deploy drones 70 to block all jaywalking pedestrians, regardless of threat level, or absent any threat from vehicles, to discourage jaywalking.

Too many false positive warning will adversely affect road users' responsiveness to a warning system. That is, a warning system outputting too many false positive warnings will lead road users to eventually ignore the warnings, thereby creating a riskier safety environment around an intersection. As such, success factors for the intersection infrastructure warning system 1 are warnings that are consistent and reliable.

The intersection infrastructure warning system including sensors, sensor fusion, and detection algorithms maintains cognitive recognition of the state and behavior of all road users in the intersection vicinity by including sensors configured to acquire data 360° around the intersection. Using data captured by the road users, the GPU of a road side unit analyzes the spatial-temporal data from road users with AI algorithms to predict the trajectories, paths, behaviors, and intents of road users around the intersection. These predictions are further analyzed by the GPU using AI algorithms to predict convergences between road users that may cause imminent threat interactions between the road users. These threats can then be ranked so that warnings can be initiated accordingly. One or more warnings can be deployed depending on the threat level. That is, multiple warnings may be employed simultaneously for different road users in different areas of an intersection to deter or prevent an accident. Alternatively, the warning devices may be used to guide road users to positions of safety.

For each threat and threat level, the warning system 1 will output the same warning response corresponding to a particular threat and threat level. In this way, consistent warning responses for each threat and threat level conditions the road users to expect a response for mitigating danger, thus increasing the safety effectiveness of the intersection infrastructure warning system 1. Reliability of the intersection infrastructure warning system 1 can be reinforced through anomaly detection and mitigation. That is, data saved by the road side unit can be output to the cloud for further modeling and simulation to detect and mitigate anomalies with the intersection infrastructure warning system 1. Consequently, threat classification and anomaly detection and mitigation are considered in training the AI algorithms.

While the preceding paragraphs describe the intersection infrastructure warning system 1 as configured to warn VRUs and vehicles around an intersection of collisions, the intersection infrastructure warning system 1 is not limited to these functions. For example, the intersection infrastructure warning system 1 described herein could also be adapted for traffic management. That is, the intersection infrastructure warning system 1 could be at intersections in lieu of police and traffic personnel to direct the flow of vehicle traffic, while also controlling the directing and controlling the flow of pedestrian traffic.

In this manner, the drones 70*a* and 70*b* can respectively warn the targeted VRUs 120*a* and 120*b* and also remedy dangerous situations by directing the targeted VRUs 120*a* and 120*b* away from the danger.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A and B should be construed to mean a logical (A OR B), using a non-exclusive logical OR. For example, the phrase at least one of A and B should be construed to include any one of: (i) A alone; (ii) B alone; (iii) both A and B together. The phrase at least one of A and B should not be construed to mean "at least one of A and at least one of B." The phrase at least one of A and B should also not be construed to mean "A alone, B alone, but not both A and B together." The term "subset" does not necessarily require a proper subset. In other words, a first subset of a first set may be coextensive with, and equal to, the first set. As used herein, the term "and/or" includes any and all combinations of one or more of the associated listed items.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PUP (PUP: Hypertext Preprocessor), Scala, Eiffel, Smalltalk, Erlang, Ruby, Flash®, Visual Basic®, Lua, MATLAB, SIMULINK, and Python®.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. An intersection infrastructure warning system for warning vulnerable road users (VRUs) of danger around an intersection, the warning system comprising:
    an edge computing device having a graphics processing unit (GPU), a central processing unit (CPU), a storage device, and a communications module configured for wired or wireless communication, the edge computing device configured to communicate with a distributed cloud networking system;
    the edge computing device located at the intersection;
    one or more sensors configured to acquire spatial-temporal data of road users, including the VRUs, in a 360° area around the intersection; and
    one or more warning devices configured to output a warning to warn targeted VRUs of the danger around the intersection, wherein
    the GPU is configured to use one or more artificial intelligence (AI) algorithms to process the spatial-temporal data of the road users to determine predictions of the road users, the predictions including at least one of a path, a trajectory, a behavior, and an intent of a road user,
    the GPU is further configured to analyze the predictions of the road users to determine convergences between the predictions of the road users to determine predicted collisions and identify the targeted VRUs,
    in response to determining predicted collisions and identifying the targeted VRUs, the edge computing device is further configured to output targeting instructions and warning response instructions to the one or more warning devices to deploy the one or more warning devices to the targeted VRUs, and
    in response to receiving the targeting instructions and warning response instructions, the one or more warning devices are further configured to target the targeted VRUs based on the targeting instructions and to output the warning to the targeted VRUs; and
    wherein the VRUs and the targeted VRUs are nonmotorists.

2. The warning system of claim 1, wherein the AI algorithms include at least one of: an Isolated Forest model and a Sequence-to-sequence model.

3. The warning system of claim 1, wherein the one or more sensors include at least one of: a camera and a detection and ranging sensor.

4. The warning system of claim 3, wherein the at least one of the camera and the detection and ranging sensor are configured as a sensor array.

5. The warning system of claim 1, wherein the one or more warning devices include at least one of: a focused light display that generates a holographic image of a sign, a holosonic device, a drone, and a jetted fluid output device.

6. The warning system of claim 5, wherein the at least one of: the holosonic device, the focused light display, and the jetted fluid output device include a pan tilt device configured to rotate and tilt the at least one of: the holosonic device, the focused light display, and the jetted fluid output device to aim an output of the at least one of: the holosonic device, the focused light display, and the jetted fluid output device at the VRU.

7. The warning system of claim 5, wherein the at least one holosonic device is a holosonic speaker configured to output an audio warning that is only audible and discernible by a targeted VRU.

8. The warning system of claim 5, wherein the at least one focused light display is configured to output a visual warning that is only visible and discernible by a targeted VRU.

9. The warning system of claim 5, wherein the at least one drone is configured to fly to a targeted VRU to at least one of:
    block a path of the targeted VRU,
    output an audio warning to the targeted VRU,
    output a visual warning to the targeted VRU, and
    guide the targeted VRU to a safe position.

10. The warning system of claim 1, wherein the edge computing device uses the predictions of the road users to determine locations of the targeted VRUs for deploying the one or more warning devices.

11. A method for warning vulnerable road users (VRUs) of danger around an intersection, the method comprising:
    identifying road users around the intersection;
    wherein VRUs are nonmotorists;
    accumulating spatial-temporal data for each of the identified road users;
    processing the spatial-temporal data for each of the identified road users to determine at least one of: trajectories, paths, intents, and spatial-temporal behaviors for each of the identified road users;
    processing the at least one of: the trajectories, paths, intents, and spatial-temporal behaviors for each of the identified road users using a first artificial intelligence (AI) algorithm to determine predictions for each of the identified road users, the predictions including at least one of: predicted trajectories, predicted paths, predicted intents, and predicted spatial-temporal behaviors;
    analyzing the predictions for each of the identified road users using a second AI algorithm to determine if any conflict zones exist for any of the identified road users, the conflict zones indicating an interaction risk between any of the identified road users;
    in response to determining conflict zones exists, identifying (i) targeted VRUs in conflict zones, (ii) threats to the targeted VRUs in the conflict zones, and (iii) time horizons of the threats to the VRUs in the conflict zones;
    prioritizing the threats to the targeted VRUs in the conflict zones;
    determining a warning response for the threats to the targeted VRUs in the conflict zones;
    determining targeting instructions to output a warning for each of the targeted VRUs; and outputting the targeting instructions and the warning response to one or more warning devices.

12. The method of claim 11, wherein the one or more warning devices include a jetted fluid output device that outputs jetted fluid.

13. An intersection infrastructure warning system for warning vulnerable road users (VRUs) of danger around an intersection, the warning system comprising:
- an edge computing device having a graphics processing unit (GPU), a central processing unit (CPU), a storage device, a communications module configured for wired or wireless communication, and a distributed cloud networking system, the edge computing device being located at the intersection;
- one or more sensors configured to acquire data for determining spatial-temporal data of road users, including the VRUs, in a 360° area around the intersection; and
- one or more warning devices configured to output a warning to warn targeted VRUs of the danger around the intersection, wherein
- the GPU is configured to use one or more artificial intelligence (AI) algorithms to process the spatial-temporal data of the road users to determine predictions of the road users, the predictions including at least one of a path, a trajectory, a behavior, and an intent of a road user,
- the GPU is further configured to analyze the predictions of the road users to determine convergences between the predictions of the road users to determine predicted collisions and identify the targeted VRUs,
- in response to determining predicted collisions and identifying the targeted VRUs, the edge computing device is further configured to output targeting instructions and warning response instructions to the one or more warning devices to output a warning to the targeted VRUs, and
- in response to receiving the targeting instructions and the warning response instructions from the edge computing device, the one or more warning devices are further configured to output the warning to the targeted VRU based on the warning response instructions; and
- wherein the VRUs and the targeted VRUs are nonmotorists.

14. The warning system of claim 13, wherein the one or more warning devices include one or more drones, the system further comprising one or more nests for the one or more drones, the one or more nests configured to dock the one or more drones when not in flight and to charge a battery of the one or more drones.

15. The warning system of claim 14, wherein the warning output by the one or more drones is a visual warning.

16. The warning system of claim 14, wherein the warning output by the one or more drones is an audio warning.

17. The warning system of claim 14, wherein the warning output by the one or more drones includes blocking a path of the targeted VRUs.

18. The warning system of claim 14, wherein the one or more drones are further configured to guide the targeted VRUs to safe location for avoiding the danger around the intersection.

19. The warning system of claim 13, wherein the at least one AI algorithm includes at least one of: an Isolated Forest model and a Sequence-to-sequence model.

20. The warning system of claim 13, wherein the one or more sensors include at least one of: a camera and a detection and ranging sensor.

* * * * *